(12) United States Patent
Siagian et al.

(10) Patent No.: US 12,190,871 B1
(45) Date of Patent: Jan. 7, 2025

(54) DEEP LEARNING-BASED AUTOMATIC DETECTION AND LABELING OF DYNAMIC ADVERTISEMENTS IN LONG-FORM AUDIO CONTENT

(71) Applicant: Amazon Technologies, Inc., Seattle, WA (US)

(72) Inventors: Christian Garcia Siagian, Los Angeles, CA (US); Charles Effinger, Palo Alto, CA (US); Nicholas Ren-Jie Capel, Los Angeles, CA (US); Jobel Kyle Petallana Vecino, Los Angeles, CA (US); Gordon Zheng, North Hollywood, CA (US); Kymry Michael Burwell, Los Angeles, CA (US); Stephen Andrew Low, Los Angeles, CA (US)

(73) Assignee: Amazon Technologies, Inc., Seattle, WA (US)

( * ) Notice: Subject to any disclaimer, the term of this patent is extended or adjusted under 35 U.S.C. 154(b) by 287 days.

(21) Appl. No.: 17/468,415

(22) Filed: Sep. 7, 2021

(51) Int. Cl.
*G10L 15/04* (2013.01)
*G06Q 30/0241* (2023.01)
*G10L 15/16* (2006.01)
*G10L 15/18* (2013.01)

(52) U.S. Cl.
CPC ...... *G10L 15/1815* (2013.01); *G06Q 30/0277* (2013.01); *G10L 15/04* (2013.01); *G10L 15/16* (2013.01)

(58) Field of Classification Search
None
See application file for complete search history.

(56) References Cited

U.S. PATENT DOCUMENTS

| 5,752,227 | A | * | 5/1998 | Lyberg | G10L 15/1807 704/235 |
| 7,617,106 | B2 | * | 11/2009 | Schramm | G10L 13/00 704/231 |
| 8,566,866 | B1 | * | 10/2013 | Fleischman | H04N 21/23424 709/204 |
| 9,258,604 | B1 | * | 2/2016 | Bilobrov | H04N 21/4821 |
| 9,837,070 | B2 | * | 12/2017 | Peng | G10L 15/26 |
| 10,417,350 | B1 | * | 9/2019 | Mohamed | G06N 20/00 |

(Continued)

*Primary Examiner* — Jakieda R Jackson
(74) *Attorney, Agent, or Firm* — Kilpatrick Townsend & Stockton LLP

(57) ABSTRACT

Techniques and methods are disclosed for detecting long-form audio content in one or more audio files. A computing system receives first audio data corresponding to a first version of an audio file and second audio data corresponding to a second version of the audio file. The computing system generates a first transcript of the first audio data and a second transcript of the second audio data. The computing system compares the first audio data and the second audio data and the first transcript and the second transcript to identify advertisement portions and content portions of the audio data. Using a semantic model based on a machine learning (ML) transformer, the computing system can determine advertisement segments within the advertisement portions, the advertisement segments corresponding to separate advertisements. Information corresponding to the duration and location of the advertisement segments is stored in a data store of the computing system.

20 Claims, 14 Drawing Sheets

(56) References Cited

U.S. PATENT DOCUMENTS

| | | | | |
|---|---|---|---|---|
| 2004/0189873 A1* | 9/2004 | Konig | | H04N 7/162 |
| | | | | 348/E7.06 |
| 2004/0194130 A1* | 9/2004 | Konig | | H04N 21/235 |
| | | | | 725/135 |
| 2005/0021517 A1* | 1/2005 | Marchisio | | G06F 16/954 |
| 2005/0160449 A1* | 7/2005 | Goronzy | | G10L 15/00 |
| | | | | 704/E15.001 |
| 2006/0149558 A1* | 7/2006 | Kahn | | G10L 15/063 |
| | | | | 704/278 |
| 2007/0106760 A1* | 5/2007 | Houh | | G06F 16/583 |
| | | | | 707/E17.02 |
| 2008/0221893 A1* | 9/2008 | Kaiser | | G10L 15/24 |
| | | | | 704/E15.005 |
| 2009/0150230 A1* | 6/2009 | Verhaegh | | H04N 21/4147 |
| | | | | 705/14.41 |
| 2010/0274674 A1* | 10/2010 | Roberts | | H04N 21/8456 |
| | | | | 715/720 |
| 2011/0222787 A1* | 9/2011 | Thiemert | | G06F 16/7864 |
| | | | | 382/224 |
| 2012/0215903 A1* | 8/2012 | Fleischman | | G06Q 30/0201 |
| | | | | 709/224 |
| 2013/0091519 A1* | 4/2013 | McLauchlan | | G06Q 30/0601 |
| | | | | 725/32 |
| 2014/0039991 A1* | 2/2014 | Gates, III | | G06Q 30/0241 |
| | | | | 705/14.4 |
| 2015/0269857 A1* | 9/2015 | Feng | | G09B 7/00 |
| | | | | 434/353 |
| 2015/0317699 A1* | 11/2015 | Tian | | G06Q 30/0269 |
| | | | | 705/14.73 |
| 2016/0007065 A1* | 1/2016 | Peles | | H04N 21/23439 |
| | | | | 725/34 |
| 2016/0171974 A1* | 6/2016 | Hannun | | G06N 3/084 |
| | | | | 704/232 |
| 2016/0269788 A1* | 9/2016 | Jones | | H04N 21/4781 |
| 2016/0323482 A1* | 11/2016 | Chung | | H04N 5/9265 |
| 2016/0337059 A1* | 11/2016 | Nehls | | H04H 60/06 |
| 2017/0062010 A1* | 3/2017 | Pappu | | G11B 27/031 |
| 2018/0068653 A1* | 3/2018 | Trawick | | G10L 15/16 |
| 2018/0103870 A1* | 4/2018 | Dow | | A61B 5/0002 |
| 2019/0019517 A1* | 1/2019 | Min | | G10L 15/26 |
| 2019/0087677 A1* | 3/2019 | Wolf | | G06V 30/226 |
| 2019/0213278 A1* | 7/2019 | Min | | G10L 15/08 |
| 2019/0221206 A1* | 7/2019 | Chen | | G10L 15/22 |
| 2020/0027445 A1* | 1/2020 | Raghunathan | | G10L 15/32 |
| 2020/0051582 A1* | 2/2020 | Gilson | | H04N 21/233 |
| 2020/0285706 A1* | 9/2020 | Singh | | G06N 3/044 |
| 2020/0342852 A1* | 10/2020 | Kim | | G10L 13/047 |
| 2021/0117470 A1* | 4/2021 | Min | | G06F 18/2413 |
| 2021/0271813 A1* | 9/2021 | Cao | | G06F 40/45 |
| 2021/0334299 A1* | 10/2021 | Sonntag | | G06F 16/3329 |
| 2021/0375288 A1* | 12/2021 | Thomson | | G10L 15/32 |
| 2021/0397846 A1* | 12/2021 | Chang | | G06N 7/01 |
| 2021/0407514 A1* | 12/2021 | Laird | | G10L 17/00 |
| 2022/0012429 A1* | 1/2022 | Weller | | G06N 3/02 |
| 2022/0293128 A1* | 9/2022 | Min | | G10L 15/08 |
| 2022/0360668 A1* | 11/2022 | Brink | | H04M 3/4936 |
| 2023/0147816 A1* | 5/2023 | Uberti | | H04L 12/1831 |
| | | | | 704/235 |

* cited by examiner ns within audio data. In particular, the disclosed techniques can allow for robust detection of a particular type of content (e.g., advertisements) in "long-form" audio content, where the content can correspond to spoken words that are longer than short phrases that are the basis of existing techniques for audio detection. As is common with much of current audio content delivery, audio content like podcasts, news programs, and the like can include advertisements that are provided "dynamically." Dynamic advertisements can vary in both duration and content, with the variations based on location, listener preferences, and other factors. As such, a podcast, for example, can include a different set of advertisements for one user in one geographical region than for a different user who obtains the same podcast in a different geographical region. Thus, two audio files for the same primary content can have significant differences in the number, locations, and durations of advertisements included in the audio files, with no consistent framework for deducing the advertisement structure beforehand. Because of the differences, desirable features of audio content playback, including text/audio synchronization, can be difficult to provide. Therefore, there exists a need for robust methods of detecting advertising segments within audio data.

DEEP LEARNING-BASED AUTOMATIC DETECTION AND LABELING OF DYNAMIC ADVERTISEMENTS IN LONG-FORM AUDIO CONTENT

BACKGROUND

Audio data can represent a variety of content, particularly podcasts, music, news, and the like. The audio data can also include advertisements in addition to the primary content. Dynamic advertising allows media providers to include advertisements that can vary in both duration and content, with the variations based on location, listener preferences, and other factors.

BRIEF DESCRIPTION OF THE DRAWINGS

Various embodiments in accordance with the present disclosure will be described with reference to the drawings, in which.

DETAILED DESCRIPTION

Figure 1:
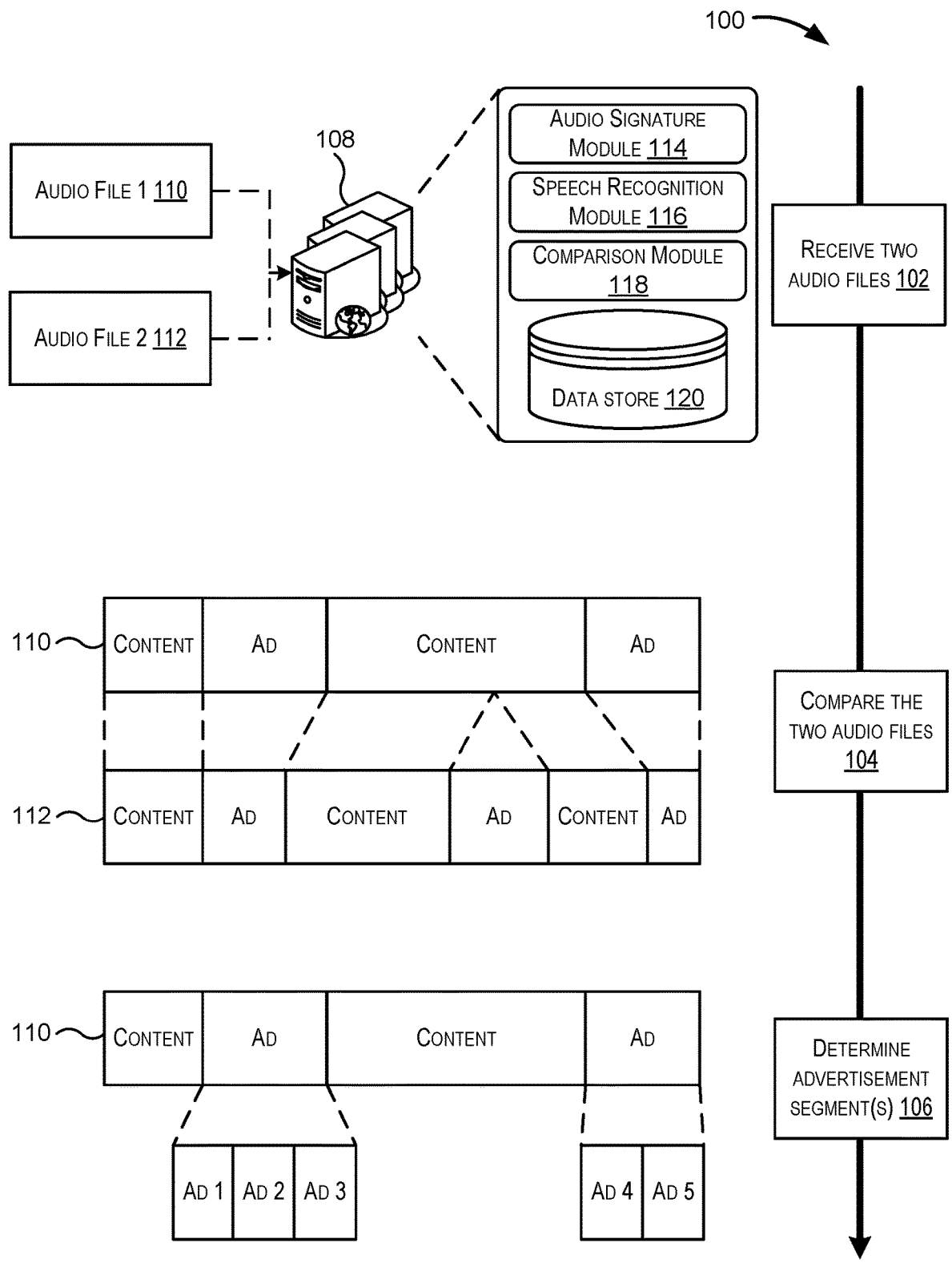
FIG. 1 is a simplified block diagram and associated flow chart of an example process to compare two audio files to identify advertisement segments, according to some embodiments.

Techniques described herein are directed to systems and methods for identifying advertisements and advertising seg- In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described. Although examples may be provided which include an audio content received at a user device, it should be appreciated that the same techniques may be applied in a variety of contexts where audio content can be received, presented, or stored, such as web or browser applications, web pages, remote servers, or the like.

Additionally, the following description uses "advertisement" content as a particular form of content for which the disclosed techniques are suitable. However, the embodiments are not limited as such and may cover other types of content including targeted content, audio commentary inserted into an audio file, sponsorship credits, and the like.

In at least one embodiment, a computing system (also referred to herein as a computer system) can receive audio data corresponding to a user-selected audio file. The computing system can be any suitable computing device, including personal computers, tablets, smartphones, or larger computing systems like distributed computing systems (e.g., a cloud computing system), a remote server in communication with a user device, etc. The user-selected audio file can be a podcast, a song or collection of songs, a news program, or other file containing audio content. The audio data can include both content and advertisements. Content, as used herein, may refer to a portion of the audio data that is the "primary" content of the audio file. Said another way, the content of, for example, a podcast can refer to the podcast's produced audio material (e.g., the spoken words of the script) exclusive of advertisements. The content for an audio file can be the same for different versions of the same file. For example, a user who downloads a podcast can receive a first version of an audio file corresponding to the podcast content. A second user who downloads the same podcast (or the same user downloading the podcast a second time) can receive a second version of the audio file corresponding to the podcast content. The underlying podcast content can be the same in both versions of the file, with the differences between the two files being the included advertisements. Although described throughout this disclosure as "advertisements," the portion of the audio files that is not the primary content may correspond to non-commercial or other media material not directly related to advertising (e.g., sponsorship credits, station affiliation credits).

In general, the advertisements can be included in the audio file dynamically. The advertisements can then be different for different versions of the same audio file. Continuing the podcast example from above, the first version of the audio file can include two blocks of advertising that break the podcast into three parts. Each advertisement block can have a varying length (e.g., 15 seconds, 30 seconds, 60 seconds, etc.) and can include one or more distinct advertisements. For example, the first advertisement block can have two 15 second advertisements, while the second advertisement block can have one 30 second advertisement and two 15 second advertisements. By contrast, the second version of the audio file can have a single advertisement block containing two 30 second advertisements. The dynamic advertisements can differ based upon user preferences (e.g., a user language) or user location (e.g., country-specific identifier for the podcast download), and may be targeted to a specific user. Therefore, in this example the two versions of audio file both contain the same podcast content, but the audio data of each file can be significantly different due to the presence of different advertisements.

Additionally, due to the number of different compression methods and audio file formats (e.g., MP3, MP4, WAV, FLAC, etc.) available for use with audio content, the audio data within two versions of an audio file can be different for portions corresponding to identical content. In the podcast example above, the first version of the file may be MP3 while the second version is MP4. The audio data corresponding to the podcast content can then be significantly different, even though the audio content, when played for the user, is indistinguishable.

To identify advertisements within the user-selected audio file, in at least one embodiment the computing system can compare the user-selected audio file and a second version of the audio file. For example, the computing system can receive a second podcast file containing the same podcast content as the user-selected audio file. Comparing the audio files can include one or both of comparing the audio data and comparing text transcripts of the audio files.

In some embodiments, comparing the audio data may include determining audio signatures (e.g., acoustic fingerprints) for the two files. An audio signature can include information corresponding to a spectral analysis of the audio data. For example, the computing system can compute a spectrogram for each audio file. For each spectrogram, the computing system can detect the peak frequencies of the audio and then determine a correlation between the detected peak frequencies to obtain the audio signature. The audio signatures can then be compared to identify portions of the audio data that have the same content. Portions having non-matching content are likely to be advertisements. Because the content (e.g., the podcast content) in each audio file may be broken up differently by different assortments of dynamic advertisements, sections of content in one file may not align, with respect to overall play time of the audio, with the corresponding content in the other file. Thus, comparing audio signatures can identify the timing offsets between matching content sections with respect to the overall play time of each file.

In some embodiments, comparing the audio data may include generating text transcripts for the two files. The transcripts may be generated by automatic speech recognition (ASR), which can include neural network machine learning models or hidden Markov models. The two transcripts can be compared using standard text-matching algorithms (e.g., Hunt-McIlroy and related algorithms). The transcripts can include time stamps for the transcribed text, such that each word has a time stamp identifying its location with respect to the play time of the corresponding audio file. Similarly to the comparison using audio signatures, the portions of the audio files containing the same content will have matching portions of text transcript. Portions of the transcripts that do not match are likely to be advertisements. Using the time stamps, windows corresponding to the matching content portions and non-matching advertising portions can be identified. The time windows can be used in conjunction with the offsets determined using the audio signature comparison to robustly determine the location (e.g., the time period within the audio file) of the advertisements within each file.

Once the advertisement portions are identified within each of the two audio files, individual advertisements within the advertisement portions can also be identified using the present techniques. In some embodiments, a semantic model (e.g., a machine learning model) may be used to determine one or more advertisement segments within the advertisement portions of the audio files (e.g., by implementing natural language understanding (NLU)). For example, a semantic model can include a transformer-encoder (e.g. a BERT transformer) and a segmentation layer. The semantic model can be trained on a corpus of text training data. The segmentation layer can be further trained on advertisement text. The portion of the transcript corresponding to the identified advertisement portion can be input into the semantic model. The semantic model can in turn output predicted starting words for the individual advertisement segments, which corresponds to start times of the advertisement segments. This timing information can be stored as segmentation data and used to identify individual advertisement segments, the locations of advertisements within the audio files, and consequently, the locations of the content portion(s) of the audio files.

The systems and methods described herein provide several advantages over conventional audio detection algorithms. In particular, the use of audio signature comparison, transcript comparison, and the semantic model can identify audio segments without a known reference file. For example, the two audio files received by the computing system can be different versions of the same podcast available for selection and download by the user. Neither audio file is required to be a canonical version or reference version. Moreover, the techniques described herein do not require any apriori information about the content of the files (e.g., length of the podcast content, locations of pre-determined advertisement breaks in the podcast, etc.). Additionally, combining audio signature matching with text matching can provide a more robust alignment of the two audio files than either technique alone. This is especially beneficial considering the presence of mistranscriptions of words in the text transcripts. A mistranscription in the content portion of one audio file may be identified as mismatching text when compared to the transcript of the other audio file. However, identifying the offsets of matched audio content from an audio signature comparison can mitigate the impact of mistranscriptions that can occur using only text matching alone.

In addition, the techniques described herein provide one or more technical improvements to a computing system implementing aspects of the techniques. For example, advertisement segmentation data can allow a computing device playing a podcast to accurately resume playback for a user if the dynamic advertisements in the podcast change (e.g., if the user begins a podcast based on a first received audio file and then subsequently receives a second audio file of the same podcast). Using the segmentation data reduces computing resources allocated to tracking and storing the user's playback progress through both the content and advertisements of the audio file. Since the locations of all advertisements have been determined in the segmentation data, only the overall progress of the playback may be tracked in order to identify an accurate resume position in another version of the same podcast. Additionally, the segmentation data allows the computing system to build an advertisement database of advertisements having known lengths to be used in further training the segmentation layer of the semantic model. The iterative improvements in the training improve resource utilization when performing the segment detection due to more efficient computations in the semantic model. Identifying individual advertisement segments also allows the computing system to store and transmit smaller portions of data corresponding to the segments.

Turning now to the figures, FIG. 1 is a simplified block diagram and associated flow chart of an example process 100 to compare two audio files to identify advertisement segments, according to some embodiments. As shown in FIG. 1, process 100 may begin at block 102, where a computing system 108 can receive two audio files, audio file 110 and audio file 112. The computing system 108 can be any suitable computing system, computing device, or combination of computing devices for receiving and comparing audio files, including server computer(s), a distributed computing system, and user devices like smartphones, tablets, or laptops. For example, the computing system 108 can represent a set of hardware servers and/or virtualized servers or virtualized computing nodes hosted within hardware systems operated by a cloud computing provider. Although not shown, the audio files 110, 112 can be received via one or more networks (e.g., the Internet) from one or more server computers or other computers suitable for hosting audio media files (e.g., a content delivery network, a content server, or the like).

The computing system may implement (e.g., as one or more cloud computing services) an audio signature module 114, a speech recognition module 116, a comparison module 118, and a data store 120 (e.g., a database or other storage that stores data usable by the modules 114-118). The data store 120 may also store the audio files 110, 112 and/or data associated with those files, including metadata and segmentation data obtained by the techniques described herein. As described briefly above, audio files 110, 112 can be audio files containing audio data having content portions and advertisement portions. For example, the first audio file 110 can be a podcast containing podcast content (e.g., the podcast show) and an advertisement portion (e.g., one or more advertisements). Similarly, the second audio file 112 can be a different version of the same podcast. The second audio file 112 can contain the same podcast content as the first audio file but contain a different advertisement portion. The diagrams illustrate the audio content segments in the audio files 110, 112 with time advancing left to right in the sequence of playback. As depicted in FIG. 1, one example of the first audio file 110 can include content divided into two parts, with a first advertisement block separating the two content segments, with a second advertisement block at the end of the file. The second audio file 112 can include content divided into three parts, with three advertisement blocks interspersed between the content segments.

In some embodiments, the first audio file 110 can be selected by a user. For example, the user may select a podcast from within a podcast application or other media service on a user device. In response, the computing system 108 can receive the first audio file 110 corresponding to the selected podcast. Additionally, the computing system 108 can receive the second audio file 112 based on an indication that the first audio file 110 was selected by the user. For example, the second audio file 112 can be received after the computing system 108 requests another audio file based upon the selection of the first audio file 110.

The second audio file 112 can be selected to increase the likelihood that the second audio file 112 contains distinct advertising portions. For instance, the user may be located within the United States and can select a podcast to download and listen to. Based on the selection, the first audio file 110 can be located by an identifier (e.g., a uniform resource identifier (URI)) that indicates a U.S. based content provider for the first audio file 110. The first audio file 110 can then include an advertisement portion that has advertisements specific to the U.S. Based on the selection, the computing system 108 can request the second audio file 112 corresponding to the same podcast but retrieved using a URI modified to indicate the selection from within Canada. The second audio file 112 can then include the same podcast content as the first audio file 110 but with an advertisements specific to Canada. By selecting the audio files 110, 112 in this manner, the advertisement portions of each are likely to be different (e.g., different products). Additionally, the advertisements may be in the same language in both audio files 110, 112 (e.g., both English) or different languages (e.g., English and French).

In other embodiments, no user selection occurs. The computing system 108 can receive audio files 110, 112 based upon a programmed routine or a predetermined schedule. For example, it may be desirable to perform advertisement segmentation to collect and store segmentation data to build a catalog of segmentation data and audio file metadata independent of user interactions.

Returning to process 100, at block 104, the computing system 108 can compare, using comparison module 118, the audio files 110, 112. The comparison can include an audio comparison and a text comparison. The audio comparison can be used to match audio signatures (e.g., acoustic fingerprints) of each of the audio files 110, 112 to identify correspondences (depicted by the dashed lines) between matching sections of audio within the audio files 110, 112. The audio signatures may be determined by audio signature module 114. As described more fully with respect to FIG. 3, the audio comparison can identify offsets between matching segments of content in the audio files 110, 112. The offsets can correspond to differences in start times or end times of one or more of the content segments. For example, due to differences in the advertisement portion of first audio file 110, the second content segment begins "later" than the corresponding second content segment of the second audio file 112. Identifying the timing and offsets of the matching audio segments can consequently determine the lengths of the matching segments and the timings relative to the overall play time of the audio file. For example, the first audio file 110 can be 60 minutes long, with the first content segment being 15 minutes in length and the second content segment 35 minutes in length and beginning 5 minutes after the end of the first content segment.

The text comparison can also be used to identify segments of content and advertisement portions within the audio files 110, 112. As described more fully with respect to FIGS. 4-5, the text comparison can be used to identify a word-to-word correspondence for transcripts of each of the audio files 110, 112. In some embodiments, the transcripts may be generated using ASR, for example by speech recognition module 116. The ASR may be a service provided by a cloud service provider associated with the computing system 108, such that the speech recognition module 116 is configured to communicate with the ASR service. In other embodiments, one or both of the transcripts may be received in addition to the audio files 110, 112. The transcripts can include time stamps for the words and/or phrases therein, such that the time stamps can identify the location of the words with respect to the play time of the corresponding audio file. The computing system 108 can compare the transcripts by performing text matching via a Hunt-McIlroy algorithm or other similar methods for obtaining difference information for two text files. The text matching can identify time windows containing text in the first transcript that matches text in the second transcript. Segments of matching text will most often correspond to content, since the corresponding words of the content in both audio files is nominally the same. Conversely, segments of mismatched text will most often correspond to advertisements, since the ads will likely be different for each audio file. As used herein, the term "mismatch" can indicate words that have no matching word in the correspondence.

Because text generated by ASR may contain mistranscriptions, several embodiments provide a mechanism to identify incorrectly mismatched text. For example, a mistranscription of the content portion (e.g., the podcast content) of the first audio file 110 may be miscategorized in the text matching algorithm as a window of advertisement in both audio files. Additionally, different advertisements can inadvertently contain the same words or phrases at the same time within the advertisement, which the text matching algorithm may identify as a segment of content. To identify incorrectly matched/mismatched segments of text in the two transcripts, the comparison module 118 of computing system 108 can determine the segments of matched text or mismatched text that have a duration less than a threshold based on the duration of adjacent segments of mismatched text and matched text, respectively. Once the incorrectly matched/mismatched segments are identified and properly categorized, the comparison can yield information describing the correspondence between the audio and text of the audio files 110, 112.

In some embodiments, the audio comparison and the transcript comparison can occur together as part of a larger deep neural network or other machine learning model implemented as part of comparison module 118. Moreover, the time window information obtained from the audio comparison, including the offsets, can be used to inform the identification of windows of matching text in the transcript comparison. For example, the start time and end time of the second content segment of the first audio file 110 can be used to identify an initial time window for the text matching of the text falling within that time window in the transcript of the first audio file 110.

Finally, at block 106, the computing system 108 can determine one or more advertisement segments within each advertisement portion. The computing system 108 may implement a semantic model that includes one or more layers. In some embodiments, the semantic model includes a machine learning layer (e.g., an ML encoder-transformer) and a segmentation layer. The semantic model can take as input a portion of the transcript corresponding to one of the identified advertisement blocks. The semantic model can then output as a prediction the starting words of individual advertisement segments within the larger advertisement portion. The starting words can have a corresponding time stamp in the transcript, such that the computing system 108 can store segmentation data identifying the duration and location of each individual advertisement segment within the audio files 110, 112. For example, the first audio file 110 may have a first advertisement portion that includes three distinct advertisements (e.g., Ad 1, Ad 2, and Ad 3). By using the portion of the transcript of the first audio file 110 as the input into the semantic model, the starting words for each of the three advertisements can be predicted. The location and duration of each advertisement segment can then be stored by the computing system 108 as segmentation data. In some embodiments, the audio signatures corresponding to the advertisement segments and the advertisement portions of the transcript can also be stored to provide a database of individual advertisements.

Variations of the computing system 108 are possible. For example, some of the functionality of the audio signature module 114, the speech recognition module 116 (e.g., ASR), and the comparison module 118 can be implemented in a user device of the computing system 108, while other functionality is implemented at a remote server or as cloud services. In another example, audio signature generation and ASR can be implemented at a user device for the first audio file 110 (e.g., the audio file selected by the user), while audio signature generation and ASR can be implemented at a remote server for the second audio file.

Figure 2:
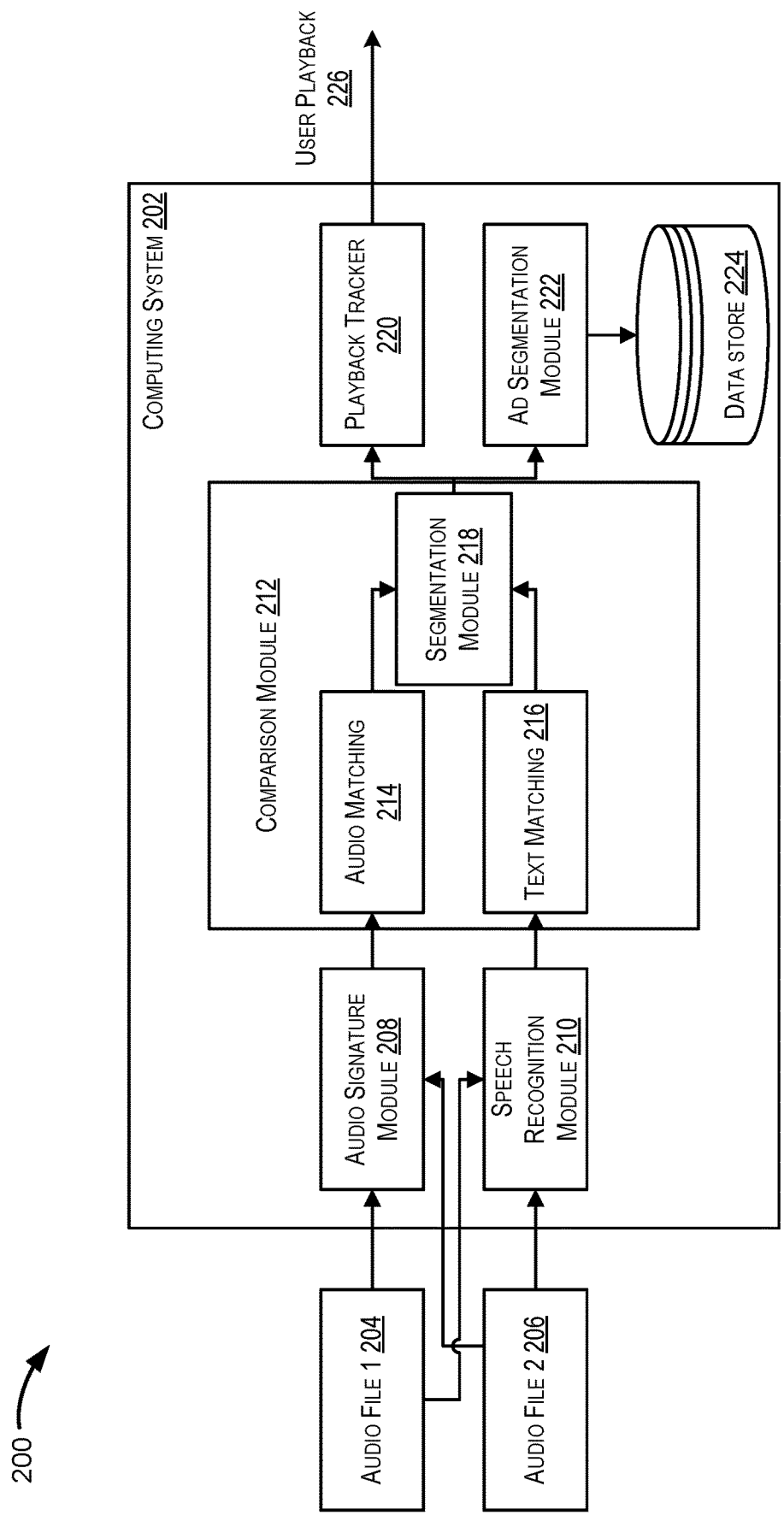
FIG. 2 is a simplified diagram illustrating at least some techniques for comparing two audio files by a computing system, according to some embodiments.

FIG. 2 is a simplified diagram 200 illustrating at least some techniques for comparing two audio files by a computing system 202. The diagram 200 includes some detailed architecture of the computing system 202 as well as process flow arrows providing a general indication of the transfer of data or information. The process flow arrows are not intended to connote any specific architectural connections between the elements detailed herein. The computing system 202 may be similar to one or more computing systems described herein, including computing system 108 of FIG. 1. Although not shown in FIG. 2, the computing system 202 may communicate with one or more additional computing devices (e.g., user device, remote servers, etc.) via one or more networks (e.g., the Internet, wireless networks, cellular networks, other private and/or public networks). A first audio file 204 and a second audio file 206 can be received by the computing system 202 over the network. The audio files 204, 206 may be similar to one or more other audio files described herein, including audio files 110, 112.

The computing system 202 can include an audio signature module 208, a speech recognition module 210, and a comparison module 212. The audio signature module 208 may be similar to audio signature module 114. Similarly, speech recognition module 210 and comparison module 212 may be similar to speech recognition module 116 and comparison module 118, respectively. As used herein, module may refer to a software application, code, or program executing on one or more processors within the computing system 202. Module may also refer to a program configured to interact with one or more services (e.g., a cloud service) for performing the functions described with respect to the module. The computing system 202 additionally can include a playback tracker 220, an ad segmentation module 222, and data store 224. The data store may be similar to other storage elements described herein (e.g., data store 120).

The computing system 202 can receive the audio files 204, 206 for comparison. Each of the audio files 204, 206 can be processed at one or both of the audio signature module 208 and speech recognition module 210. The audio signature module 208 can generate audio signatures for each of the audio files 204, 206. To generate the audio signatures, the audio signature module 208 can convert the audio files 204, 206 to a raw digital audio format (e.g., WAV). The audio signature module 208 can then perform audio processing techniques (e.g., spectral analysis) on the digital audio data to generate the audio signatures.

The audio signatures may be acoustic fingerprints determined by spectral analysis of the audio data contained in the audio file. For example, the audio signature module 208 can generate a spectrogram (e.g., by a fast-Fourier transform method) of the audio data corresponding to the first audio file 204. The spectrogram represents audio spectral power as a frequency versus time plot. Based on the spectrogram, the audio signature module 208 can identify frequency peaks corresponding to frequencies with the highest power in the audio spectrum. The audio signature module 208 can identify one or more anchor peaks from the identified peaks. For each anchor peak, the audio signature module 208 may determine a relationship between the anchor peak and one or more target frequency peaks in a region of interest of the spectrogram. The relationship can be defined by the anchor peak frequency, the target peak frequency, and the time interval between them. The region of interest can be a region of the spectrogram defined by a time window and a frequency window (e.g., a rectangle in the spectrogram). Then, the audio signature the region of interest can be composed of the relationship data between the anchor peak and the target peaks in the region of interest. One skilled in the art would recognize addition details and variations of determining audio signatures and/or acoustic fingerprints.

The speech recognition module 210 can generate a transcript for each audio file received. The speech recognition module 210 may implement ASR. In some embodiments, the ASR can be provided as a cloud service in communication with the speech recognition module 210. The transcripts can include time stamps for each word in the text of the transcript to provide a time correspondence with the audio files 204, 206. For example, the transcript of a one hour podcast with advertisements may include approximately 9,000 words. Each word can be identified with a time stamp that of the playback time within the podcast when that word is spoken.

The audio signatures from audio signature module 208 and the transcripts from speech recognition module 210 can then be used as inputs into the comparison module 212. The comparison module 212 can include one or more processes for audio matching 214, text matching 216, and a segmentation module 218. It should be noted that segmentation module 218 and ad segmentation module 222 have different functionality.

The comparison module 212 may perform audio matching 214 by executing a multi-pass matching algorithm with the audio signatures corresponding to the first audio file 204 and the audio signatures corresponding to the second audio file 206. Matching two audio signatures can include, for a particular time duration (e.g., 10 seconds), identifying matching relationship data (e.g., the anchor peak frequencies, target peak frequencies, and time interval) for regions of interest that fall within that time duration. Matching can be made robust against noisy signals by allowing a "match" to coincide with a small deviation (e.g., 2 ms) of the compared time intervals of the relationship data in the audio signature. The windows of matched audio signatures in each of the audio files 204, 206 (e.g., windows exceeding the particular time duration) may be offset by several seconds relative to the playtime of each audio file. For example, the audio matching 214 may identify a three minute window of audio in the first audio file 204, from t=5 minutes to t=8 minutes of the overall play time of the first audio file. This window may be matched to a corresponding three minute window of audio in the second audio file 206, from t=6 minutes, 30 seconds to t=9 minutes, 30 seconds of the overall play time of the second audio file. The matched window is therefore, in this example, offset by 1 minute, 30 seconds between the audio files 204, 206. The comparison module 212 may perform audio matching 214 iteratively to converge the identified offsets and matched window timings to final values.

The comparison module 212 may also perform text matching 216 by executing a text matching algorithm (e.g., a Hunt-McIlroy algorithm) on the transcripts generated by speech recognition module 210. The output of the text matching 216 may be a word-to-word correspondence between the two transcripts. The correspondence may identify matched words and mismatched words in the transcripts, including timings (e.g., based on the time stamps of each word in the transcripts) of the matched or mismatched words.

The comparison module 212 may perform segment identification and verification based on one or more of the outputs of the audio matching 214 and the text matching 216 using segmentation module 218. In some embodiments, only audio matching 214 may be performed, which results in matched audio segments and offsets between them. In these embodiments, the segmentation module 218 may perform limited operations to categorize the matched audio as content segments and the mismatched audio as advertisements.

In several embodiments, the segmentation module can identify miscategorized time windows of matched and mismatched text from the text matching 216. For example, a mistranscription of text in a content segment can result in a small window of mismatched text from the text matching 216. The mismatched text can be miscategorized as "advertisement" since the initial assumption is that the content portion of the audio files will have the same words at the same (relative/offset) time. Because the miscategorized window will be small compared to adjacent windows of correctly matched content text, the miscategorized window can be identified by finding windows of short duration compared to a ratio of the duration to another duration of one of the adjacent windows. If this ratio falls below a threshold, then the short duration window is categorized as the same type (e.g., content or advertisement) as the adjacent windows and merged with the adjacent windows. Additional thresholds are possible, including a ratio of the miscategorized short window to the duration of the window that would result if merging occurred.

In some embodiments, the comparison module 212 may use both the audio matching 214 output and the text matching 216 outputs to identify and categorize audio segments. For example, segmentation module 218 can use the alignment and offset information from the audio matching 214 and the text correspondence from the text matching as an input into a deep neural network (DNN), a conditional random field (CRF) model. In these embodiments, the outputs of the model can be a prediction of merged and aligned time windows corresponding to the content portion and the advertisement portion of the audio files 204, 206.

The output of the segmentation module may include merged audio and text data for each of the audio files 204, 206, with segments of content and advertisements identified by corresponding time windows (e.g., start times and end times of each content segment and each advertisement portion). The playback tracker 220 can use the merged audio and text data to track a progress of the playback of the audio files (e.g., playback on a user device). For example, the first audio file 204 may be played at a user device (creating user playback 220) for 30 minutes, which can correspond to the user having listened to 25 minutes of content and 5 minutes of advertisements. The playback may then be stopped. The playback tracker 220 can track the 30 minute progress (e.g., by storing progress data for the elapsed time). Because the advertisements in each of the audio files 204, 206 may have different durations and different locations, the same elapsed time may not correspond to the same elapsed content in each audio file. The playback tracker 220 can then use the merged audio content to determine a resume position that corresponds to the same 25 minutes of elapsed content in the second audio file 206. If the user playback 226 is restarted using the second audio file 206, the playback tracker can resume the user playback 226 at resume position. In this way, the user playback 226 begins at the same relative position with respect to the content and without regard to the advertisements.

Finally, the computing system 202 can determine one or more advertisement segments within the advertisement portions identified by the segmentation module 218. The ad segmentation module 222 can execute a semantic model (e.g., an ML model) to perform classification tasks on a portion of the transcript text corresponding to the identified advertisement portions. As described in more detail below with respect to FIG. 6, the semantic model can include an ML transformer-encoder and a classification layer. The semantic model can be trained using a corpus of text. Additionally, the classification layer can be further trained on a second corpus of text from advertisements of known lengths. In this way, the semantic model can take a portion of the transcript text for the identified advertisement and identify distinct advertisements within each advertisement portion. The position (e.g., start time relative to the overall play time) of the advertisement segments and the duration and location of the larger advertisement portion within the corresponding audio file can be stored in data store 224 as segmentation data. Additionally, the audio signatures corresponding to the advertisement segments can also be stored in data store 224 as a component of the segmentation data.

Figure 3:
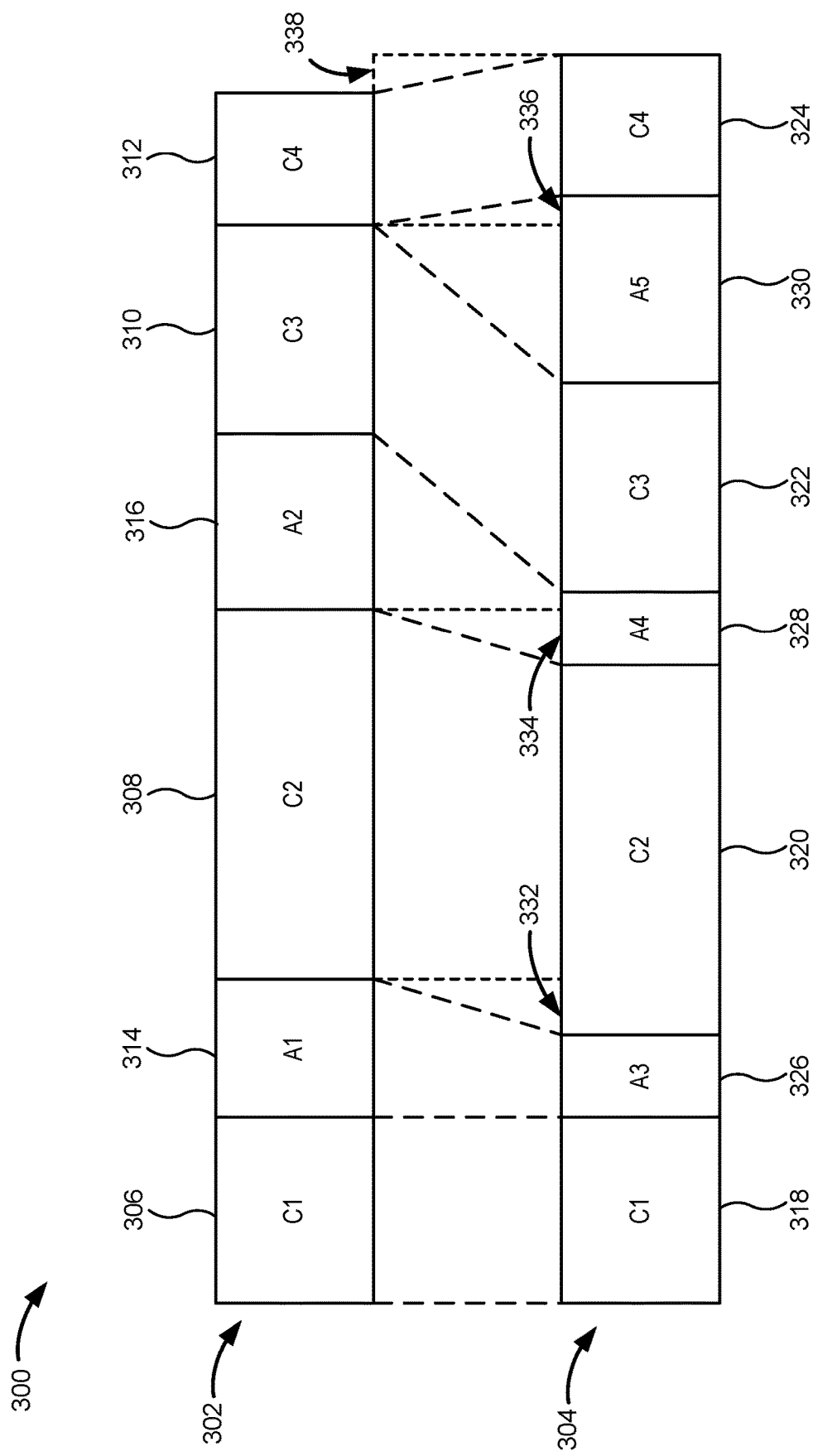
FIG. 3 is a diagram illustrating two audio files containing similar content but different advertisements, according to some embodiments.

FIG. 3 is a diagram 300 illustrating a comparison 30 of two audio files containing similar content but different advertisements, according to some embodiments. A first audio file 302 and a second audio file 304 may be similar to other audio files described herein, including audio files 110, 112 of FIG. 1. As shown in FIG. 3, the first audio file 302 can include content segments 306-312 and advertisement segments 314, 316. Content segments 310 and 312 may be considered as one larger segment of consecutive content within the first audio file 302. Similarly, the second audio file 304 can include content segments 318-324 and advertisement segments 326-330.

The diagram 300 depicts time along the horizontal axis of the figure, with time advancing from left to right for a play through (e.g., playing the audio file on a user device) of the audio content in the audio files 302, 304. In this way, the widths (e.g., lengths) of the segments depicted correspond to time durations (e.g., time windows) of the segments. Moreover, the overall length of the representative figures for each audio file corresponds to the overall length of the audio content of the respective audio file. The diagram illustrates the files aligned on the left to indicate beginning from the same initial time (e.g., t=0).

The content segments 306-312 of the first audio file 302 may be the same as content segments 318-324 of the second audio file 304. Because the content is the same, each segment may have the same duration as the corresponding segment. For example, content segment 306 is the same as content segment 318. The long-dashed lines identify the correspondence between the start times and end times of the content segments. The short-dashed lines mark the absolute time reference from the initial time.

The comparison between the audio files 302, 304 may be done by audio signature matching (e.g., by audio signature module 208 and audio matching 214). As described herein above, the audio signature matching can identify time windows of matching content between the two audio files 302, 304. Because the start time and end times of the matched time windows do not occur at the same absolute time for each file, the audio matching can identify one or more offsets based on the start times or end times of matching time windows. For example, content segment 308 matches, based on an audio signature match, content segment 320. Content segment 320 begins earlier in the second audio file 304, since the intervening advertisement segment 326 is shorter than advertisement segment 314 of the first audio file. An offset 332 can be determined corresponding to the relative difference in start times of content segment 308 and content segment 320. Similarly, an offset 334 can be determined based on the end times of content segment 308 and content segment 320. Offset 332 and offset 334 may be equal or may differ by a small quantity based on the accuracy of the audio signature matching.

The audio signature comparison may also match larger segments in one audio file to more than one segment in the other audio file. For example, the content segments 310, 312 may be considered as one larger content segment at the end of the first audio file 302. The larger segment can then have a start time corresponding to the start time of segment 310 and an end time corresponding to the end time of segment 312. The comparison can determine offset 338 based on the end times of the larger content portion containing content segments 310, 312 and the end time of content segment 324. The comparison can also determine offset 336 based on the duration of content portion 322, the duration of content portion 324, and offset 338.

Consequently, the audio signature comparison can result in information characterizing the lengths of content segments and advertisement segments in each of the audio files 302, 304, as well as offsets (e.g., offsets 332-338) that characterize the relative alignment of the segments.

Figure 4:
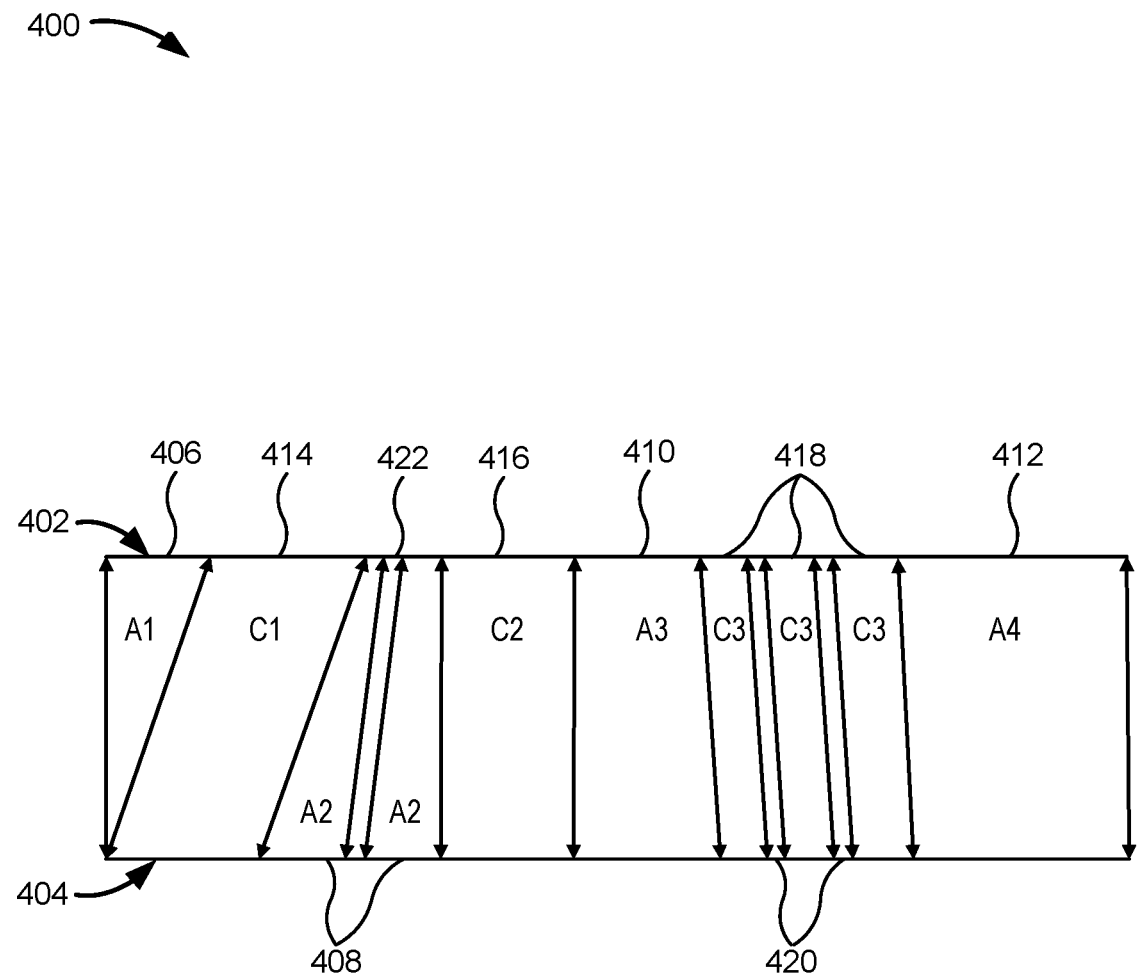
FIG. 4 is a diagram illustrating a word-level correspondence between two audio files containing content and advertisement portions, according to some embodiments.
Figure 5:
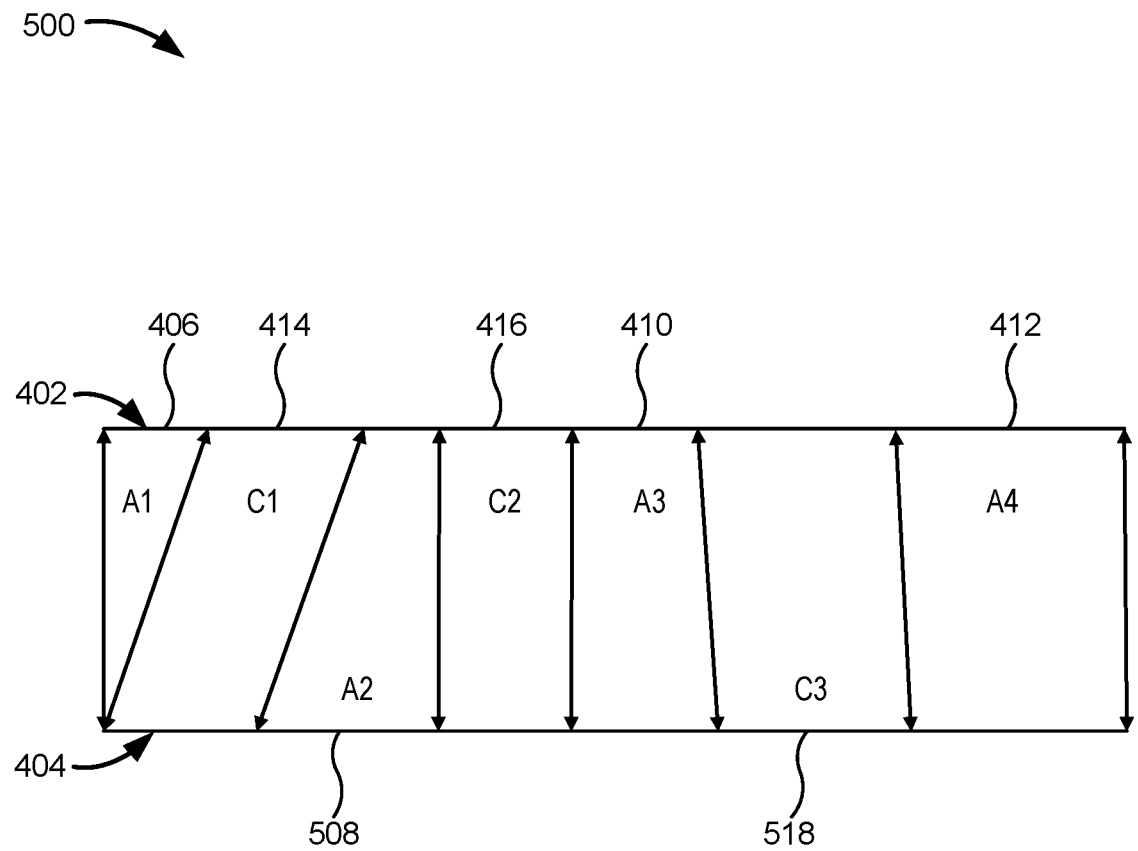
FIG. 5 is a diagram illustrating the word-level correspondence between two audio files after identifying and merging miscategorized windows, according to some embodiments.

FIGS. 4 and 5 are simplified diagrams illustrating a word-level correspondences 400, 500 between two audio files containing content and advertisement portions, according to some embodiments. FIG. 4 depicts the correspondence 400 before applying a window merging technique of the present disclosure. FIG. 5 depicts the correspondence 500 after applying the window merging. The word-level correspondence may be determined by matching transcripts of two audio files using a text matching routine (e.g., speech recognition module 210 and text matching 216 of FIG. 2). A first audio file 402 and a second audio file 404 may be similar to other audio files described herein, including audio files 302, 304 of FIG. 3. In the simplified diagram of FIG. 4, the first audio file 402 is illustrated as a horizontal line, with time advancing from left to right. A second audio file 404 is similarly illustrated. The regions between the lines are marked with arrows indicating the boundaries of windows of matched and mismatched text from the transcript comparisons. Thus, for example, C1 indicates a content segment that has a matched correspondence for every word between the arrows bounding C1, while A3 indicates an advertisement segment that has a mismatched correspondence or no correspondence for every word between the arrows bounding A3. In some embodiments, the word-level correspondence can be significantly more fragmented due to the presence of additional mistranscriptions in content portions or inadvertent matches in advertisement portions.

In the exemplary embodiment of FIG. 4, the first audio file 402 can include advertisement segments 406-412 and content segments 414-418. Similarly, the second audio file 404 can include the corresponding content segments 414-418. The second audio file 404 does not have advertisement segment 406, but does include advertisement segments 408-412. Because of mistranscriptions, content segment 416 may be fragmented into non-contiguous segments (e.g., three as shown in FIG. 4). For example, miscategorized windows 420 correspond to mismatched words in the middle of content segment 418. Similarly, inadvertent matches can fragment advertisement segments. For example window 422 corresponds to matched words identified in the differing advertisements of the audio files 402, 404.

The windows 420 and window 422 correspond to miscategorized windows in the transcripts of the audio files 402, 404. To correctly categorize the word-level correspondence, the miscategorized windows can be identified and reclassified (e.g., by segmentation module 218). To do so, a computing system (e.g., computing system 202) can merge one or more of the windows with another window to obtain a merged window. The windows selected for merging can be based on the length of the windows. For example, the selected windows can be the largest windows of one type (e.g., content or advertisement) that are adjacent to the smallest windows of the other type. To determine which windows are merged first, the computing system can compute a ratio of the length of the small "gap" window of one type to the length of the resulting merged window (that is to say, if the gap window were merged with the windows on either side). Alternatively, or in combination, the system can compute a second ratio of the length of the small "gap" window and the length of the smaller of the two adjacent windows. If the computed ratios fall below a threshold, the selected windows may be merged. If multiple selected windows have computed ratios falling below the threshold, the mergers can be prioritized based on the lowest ratio. After merging the first selected windows, the lengths of the newly merged windows can be used to compute further ratios to iteratively remove the miscategorized windows.

Based on the threshold, the iterative merging process may end with some small, miscategorized windows remaining as fragments within the larger, correctly categorized segments. The process can then identify all remaining small windows as content segments (rather than advertisement segments).

As a specific example of the above description, window 422 has a length that is small when compared to the length of the resulting merged window if window 422 were merged into segment 408. Based on the ratio falling below the threshold, window 422 can be merged into segment 408, resulting in merged advertisement window 508 of FIG. 5. Similarly, windows 420 can be merged with segment 418 to produce merged content window 518.

Figure 6:
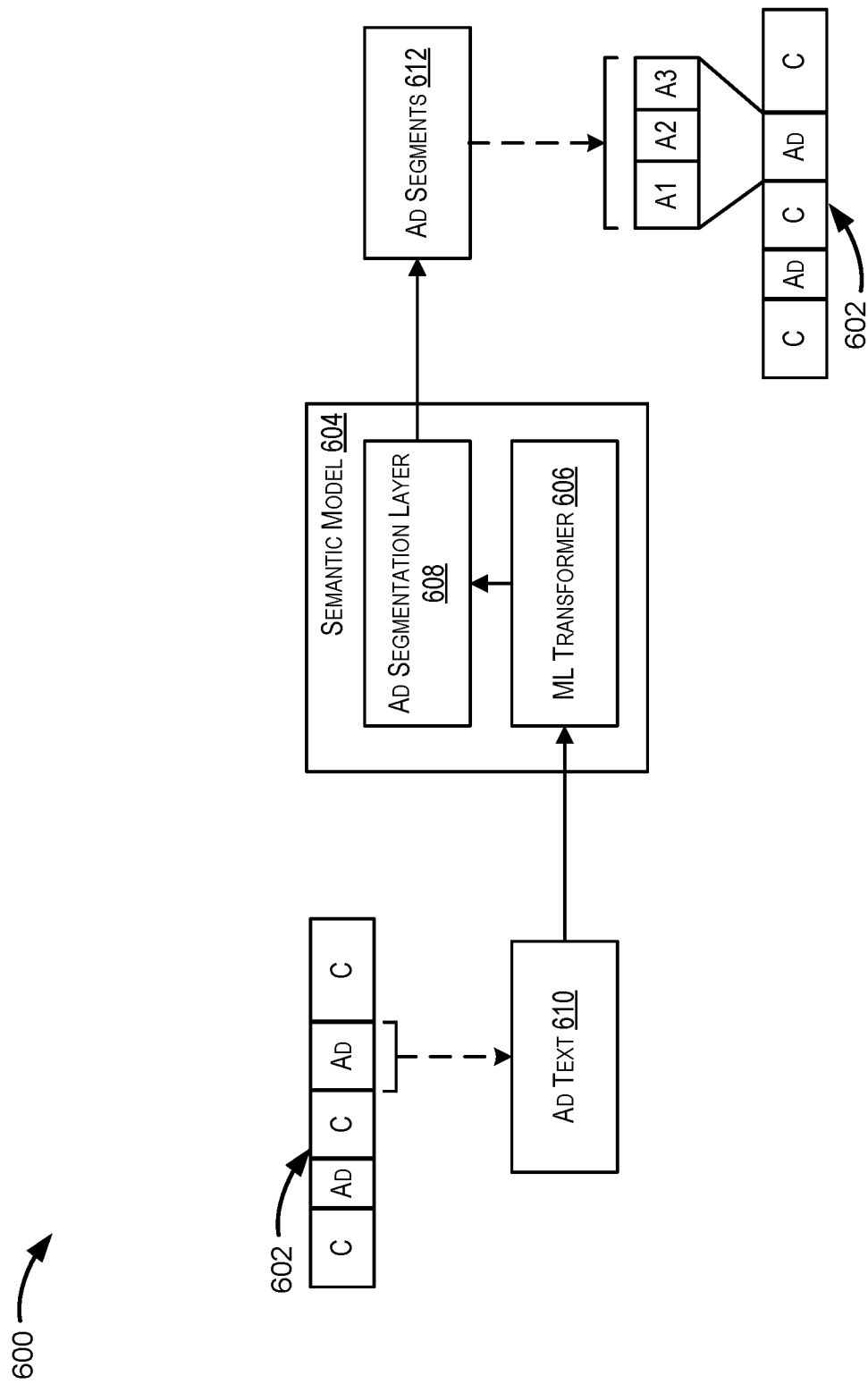
FIG. 6 is a simplified block diagram of a semantic model for determining advertisement segments within an advertisement window, according to some embodiments.
Figure 7:
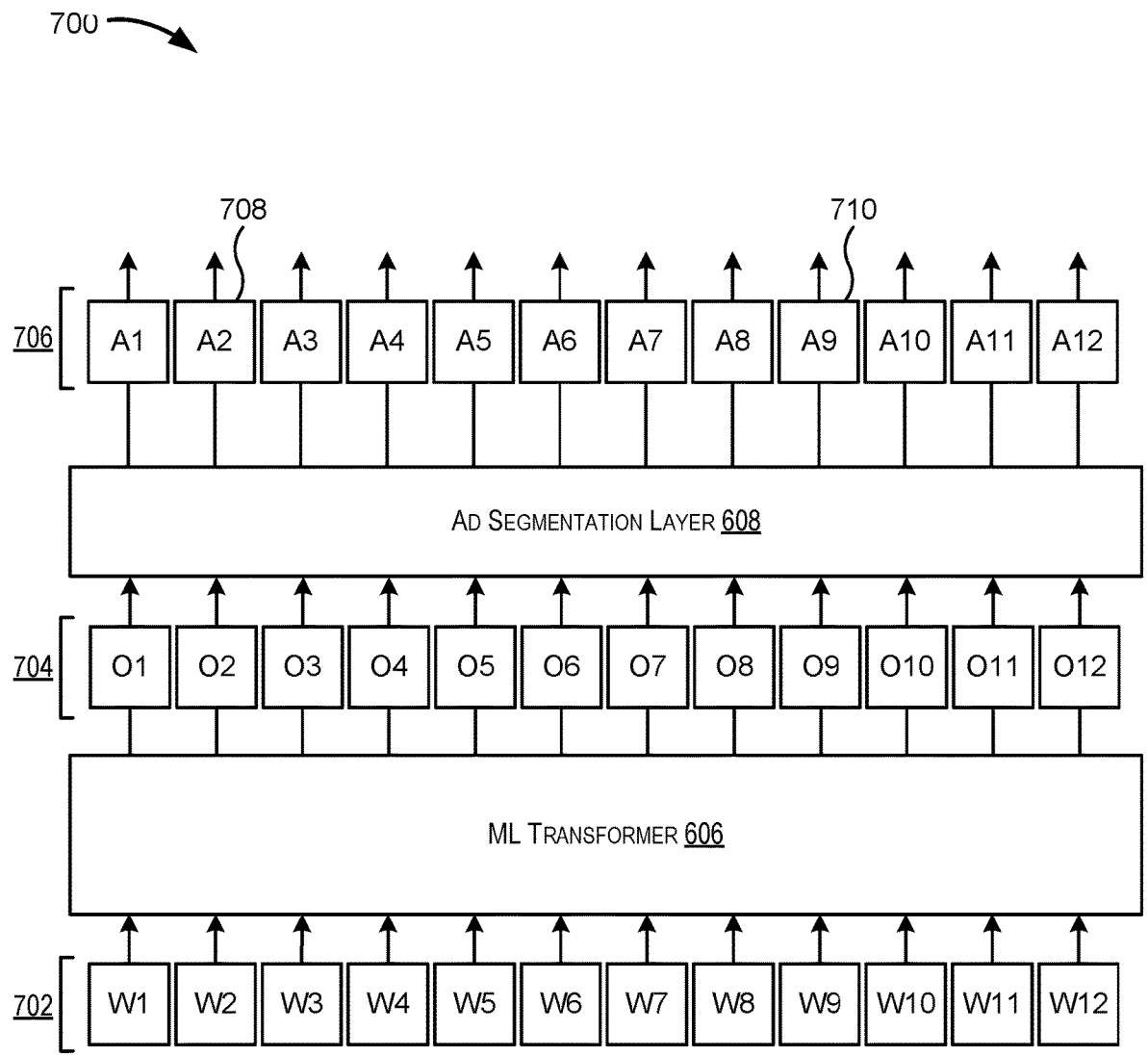
FIG. 7 is a block diagram illustrating inputs and outputs of a machine learning transformer and an advertisement segmentation layer of a semantic model that can identify advertisement segments, according to some embodiments.

FIGS. 6 and 7 illustrate a machine learning semantic model to identify advertisement segments within a larger portion of advertisement text. FIG. 6 is a simplified block diagram illustrating segmenting 600 advertisements using a semantic model 604 to determine advertisement segments 612 within an advertisement window, according to some embodiments. FIG. 7 is a simplified block diagram of an example operation 700 of the semantic model 604. The semantic model 604 may be implemented by a computing system (e.g., computing system 202) as one or more components of an ad segmentation module (e.g., ad segmentation module 218) to identify distinct advertisements within a larger block of advertisements (e.g., an advertisement portion or advertisement segment of audio files 110, 112 and audio files 204, 206).

The semantic model 604 can include an ML transformer 606 and an ad segmentation layer 608 (e.g., a classification layer). In general, the ML transformer 606 can be set up as an encoder that generates embedding vectors in response to input, including text input (e.g., ad text 610). For example, the ML transformer 606 can be a pre-trained system (e.g., trained using benchmark training text data or similar text data), such as a Bidirectional Encoder Representations from Transformers (BERT), an optimized BERT (e.g., RoBERTa), a Generative Pre-trained Transformer (GPT), and the like. Models like BERT can include multiple encoding layers (not shown in FIG. 6 or 7) that iteratively process the input one layer after another. The encoding layers function to generate encodings (e.g., embeddings 704) containing information about which parts of the input are relevant to other parts of the input. Each encoding layer outputs an encoding as input into the next layer. The BERT model typical includes 12 or 24 encoding layers.

For a particular input 702 (e.g., a set of words from a text), the output of the ML transformer 606 is an embedding vector 704. The embedding vector is a vector of elements, each corresponding to a numeral representation of information learned about the input. The number of elements represent the embedding dimension.

The ad segmentation layer 608 can be a layer set up for a classification task. The classification task can be learned during the training of the semantic model 604. Although depicted as a single layer, the ad segmentation layer 608 can include additional layers. Given the ad text 610 as input into the ML transformer 606, an embedding vector is output to the ad segmentation layer 608. The ad segmentation layer 608 then performs the classification task.

An audio file 602 may first be compared with a second audio file to identify content portions and advertisement portions of the audio content within the file. The audio file 602 may be similar to any of the other audio files described herein (e.g., first audio file 112). Based on the comparison, the computing system can identify a portion of a transcript of the audio file 602 as ad text 610 corresponding to an advertisement portion of the audio file 602. For example, the computing system can use the merged windows (e.g., window 508 of FIG. 5) obtained from the comparison to identify a start time and an end time of the advertisement portion in the transcript. The text within the start time and the end time is the ad text 610.

Classifying the advertisement text can include predicting the first word of separate advertisement segments 612. As illustrated in the simplified model of FIG. 7, the input 702 into the ML transformer 606 can include words W1 through W12. In practice the ML transformer 606 can have more input words (e.g., 512 words) than illustrated here. The ML transformer 606 can output an embedding 704 including output tokens O1 through O12, which are the inputs into ad segmentation layer 608. The predicted text 706 is the output from the ad segmentation layer 608 and includes words A1 through A12. Based on the input 702, the ad segmentation layer may predict starting word 708 and starting word 710 (e.g., A2, and A9) as the words that begin each distinct advertisement segment.

As another similar example, audio file 602 can include an advertisement with three advertisement segments A1, A2, and A3. The advertisement may have a corresponding transcript of 100 words (identified in sequence 1-100). Based on the semantic relationship of the words input into the semantic model 604, the ad segmentation layer 608 can predict that words 2, 32, and 65 are the starting words of segments A1, A2, and A3, respectively. Because the transcript contains time stamp information for each word, knowing the starting words of successive ad segments 612 can also provide a corresponding location of the advertisement segments in the audio data of the audio file 602.

Figure 8:
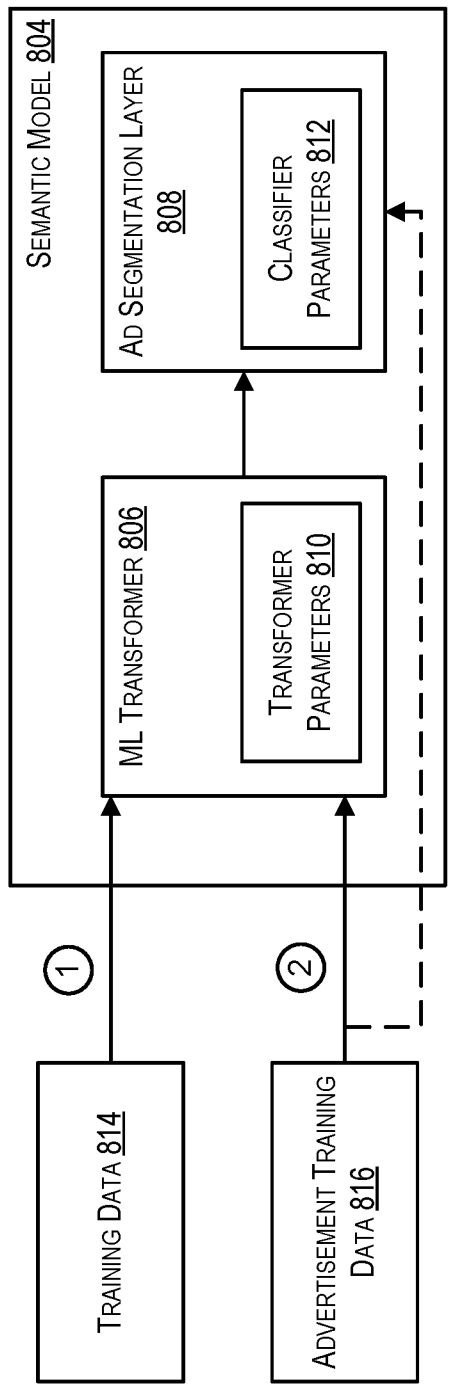
FIG. 8 is another simplified block diagram depicting a method of training a semantic model, according to some embodiments.

FIG. 8 is another simplified block diagram depicting a method 800 of training a semantic model 804, according to some embodiments. The semantic model 804 may be similar to semantic model 604 of FIG. 6 and other semantic models described herein. As such, ML transformer 806 and ad segmentation layer 808 may likewise be similar to ML transformer 606 and ad segmentation layer 608, respectively. Training the ML transformer 806 and ad segmentation layer 808 can be done jointly. Additionally, the ad segmentation layer 808 can be retrained to update parameters to enhance the task performance for a the particular task of identifying advertisement segments.

The semantic model 804 can include a number of parameters that characterize the model. The parameters can correspond to transformer parameters 810 of the ML transformer 806 and classifier parameters 812 of the ad segmentation layer 808. To establish the parameters, the semantic model 804 can be trained to perform one or more tasks (e.g., classification tasks, prediction tasks, etc.) based on a corpus of training text. In some embodiments, the ML transformer 806 (e.g., BERT, RoBERTa, GPT, etc.) is pretrained using a benchmark corpus (e.g., the English language Wikipedia). Training as described herein can refer to training on the benchmark corpus or fine tuning the parameters for either the ML transformer 806 and the ad segmentation layer 808.

The training data 814 can include text that was previously collected relating to the task for the semantic model. For example, podcast transcriptions may be used to train both the ML transformer 806 and ad segmentation layer 808. In this example, the training may be a fine tuning of the ML transformer 806 and ad segmentation layer 808 based on text corresponding to language that is typically more colloquial than text found in a pretraining corpus like Wikipedia. In this way, the parameters of the semantic model may be tuned to better process language similar to language present in the target audio files (e.g., podcasts). Other similar text may be used, including news transcripts, song transcripts, radio transcripts, and the like. The training data 814 is input to the Ml transformer 806. For each input text, the ML transformer 806 generates training embedding vectors corresponding to different sets of words from the training text. The training embedding vectors are then input into the ad segmentation layer 808, which in turn outputs a training task output corresponding to output data of the ad segmentation task. The output data can be compared to a ground truth corresponding to the input text. Based on a difference between the output data and the ground truth (e.g., via a loss function or other optimization function), the transformer parameters 810 and classifier parameters 812 can be updated. The parameters may be updated using, for instance, a backpropagation algorithm. The update can be performed iteratively across the training data 814, with the goal of minimizing a loss function.

In some embodiments, after training the semantic model 804, the ad segmentation layer 808 can be retrained using a second corpus of text. Retraining the ad segmentation model can include fixing or freezing the transformer parameters 810 and then inputting the new training data. The new training data can include advertisement training data 816. The advertisement training data 816 can include text from advertisements of known lengths (e.g., advertisements with a well-defined ground truth and known word length). According to certain embodiments, the advertisement training data 816 can included additional padding words added to the start and end of the advertisements of known length to improve robustness of the training. As with the initial training of the semantic model 804, the ML transformer 806 will produce embedding vectors based on the input advertisement training data 816, which will then be input into the ad segmentation layer 808 to create output data to compare against a ground truth. Based on a difference between the output data and the ground truth (e.g., from another loss function), the classifier parameters 812 can be updated. In this way, the semantic model 804 can be tuned to accurately determine individual advertisement segments within a larger portion of advertisement text.

Training the semantic model may be supervised or unsupervised. For example, training the ad segmentation layer 808 may be supervised. The advertisement training data 816, can include training labels. The training labels can indicate a starting word of an advertisement, e.g., an advertisement of known length in the advertisement data. If the predicted starting word differs from the true starting word, the training label may include information about the difference and/or the reason for the difference between the prediction and the starting word indicated by the training label. In other embodiments, the training may be unsupervised and not rely on training labels.

According to certain embodiments, the semantic model 804 can be a multi-language model (multi-language models) for identifying and determining advertisements having text in different languages. For example, one advertisement segment in an audio file may be in English while a second advertisement segment may be in French (for instance, in Canada). An appropriately configured ASR process may provide an accurate transcription of the two advertisement segments, but a semantic model trained only on English text may fail to accurately predict the starting words of the advertisement segments. The multi-language model can be a model incorporating a transformer-encoder, for instance multilingual BERT (mBERT), cross-lingual language models (XLM), or XLM with RoBERTa (XLM-R). The multi-language model can be trained and retrained on text corpuses comprising text in different languages. The computing system can implement a language verification on the transcripts to determine which (or both) semantic models can process the advertisement portion of the text.

Figure 9:
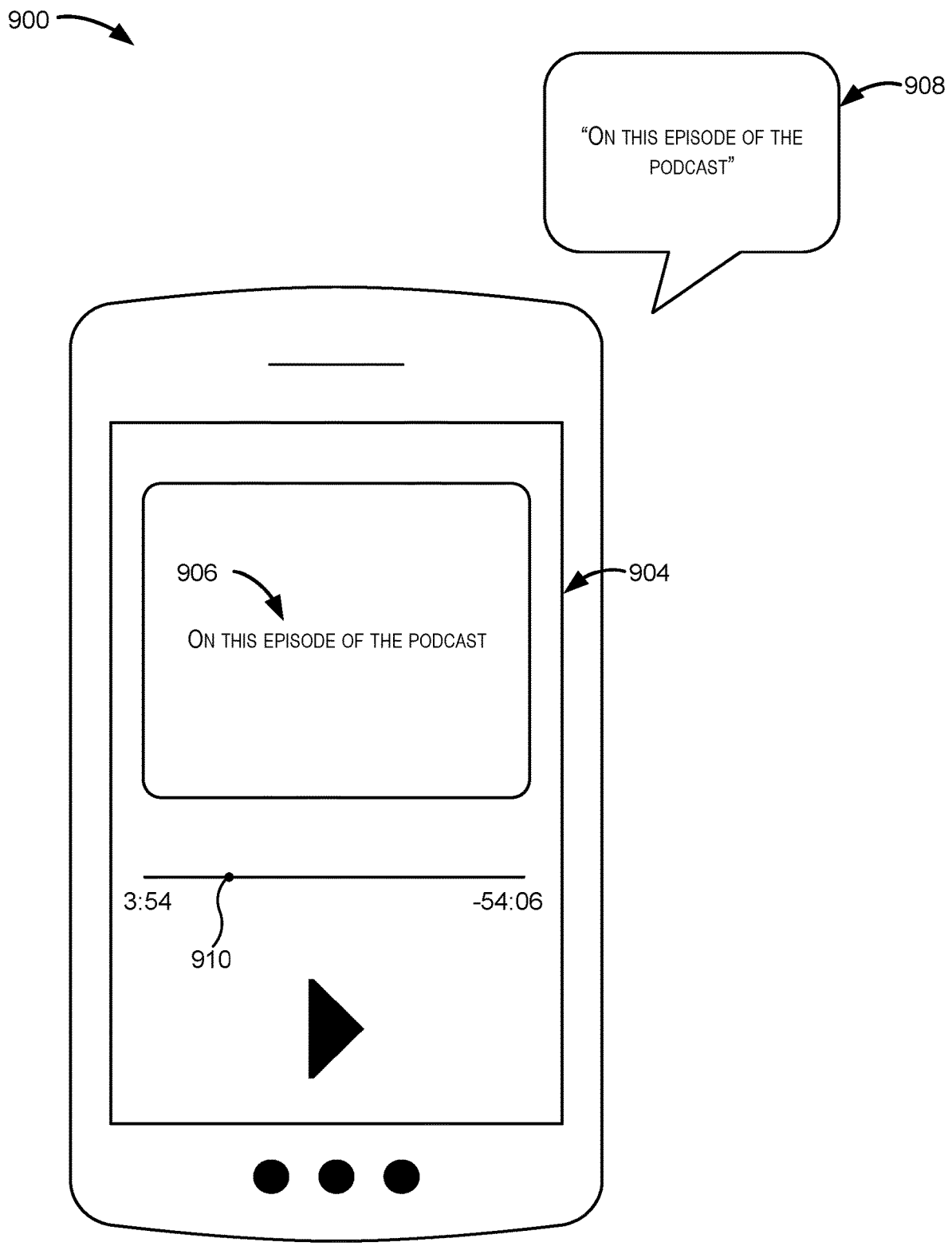
FIG. 9 is a diagram depicting a user device presenting audio content and corresponding text content of an audio file, according to some embodiments.

FIG. 9 is a diagram depicting a user device 900 presenting audio content and corresponding text content of an audio file, according to some embodiments. The user device 900 can be a computing component of a computing system (e.g., computing system 202). In some embodiments, the user device 900 can perform some or all of the operations described herein with respect to one or more computing systems.

The user device 900 can include a display presenting a graphical user interface (GUI) 904 displaying icons and symbols for invoking and interacting with the playback of an audio file (e.g., audio file 110). Although the primary content of an audio file is audio, and thus intended to be listened to, additional content can be presented to a user through the GUI 904. For example, enhanced podcasts may include images or text intended to accompany the audio content. As a particular example related to the techniques described herein, a text transcript of the audio file (e.g., a transcript generated by speech recognition module 210) may be presented during the audio playback of the audio file. To improve the user's ability to read the accompanying transcript, a portion 906 of the transcript is displayed synchronized with the corresponding audio content 908.

To synchronize the portion 906 of the transcript with the audio content 908, the computing system can use segmentation data (e.g., segmentation data determined by ad segmentation module 222) and comparison information (e.g., timings of content windows and advertisement windows determined by comparison module 212) obtained by comparing the audio file with a second audio file. For example, the computing system can use comparison information to identify a start time and an end time of a content portion. The computing system can then synchronize the transcript to the start time and end time. Because the user may not want advertisement text displayed during an advertisement, and because the advertisements can be dynamic, merely synchronizing the transcript with the audio playback can be undesirable. The computing system can use the segmentation data to locate portions of the transcript corresponding to advertisements and not display the text.

In addition, the computing system can track a progress 910 of the playback of the audio file. As depicted, the progress 910 can represent an elapsed time (e.g., 3 minutes, 54 seconds) of a total time (e.g., 58 minutes) of the audio file. Based on the tracked progress 910, the computing system can determine a resume position for the audio file that is consistent with the content of the audio file without regard to variations in the advertisements in the audio file. For example, the progress 910 at 3 minutes 54 seconds may correspond to the user having listened to an introductory advertisement of two minutes and an introductory portion of content of just under two minutes. If the user stops the playback of the audio file, the computing system can determine a resume position that accounts for the approximately two minutes of content already listened to. If the user has to download a second audio file containing the audio content (e.g., an audio file with no introductory advertisements), beginning from an absolute position of 3 minutes 54 seconds of elapsed time would skip almost two minutes of content that the user has not listened to. The computing system can then use the resume position to accurately restart the playback to account for differences in the advertising portions between the audio file and the second audio file.

Figure 10:
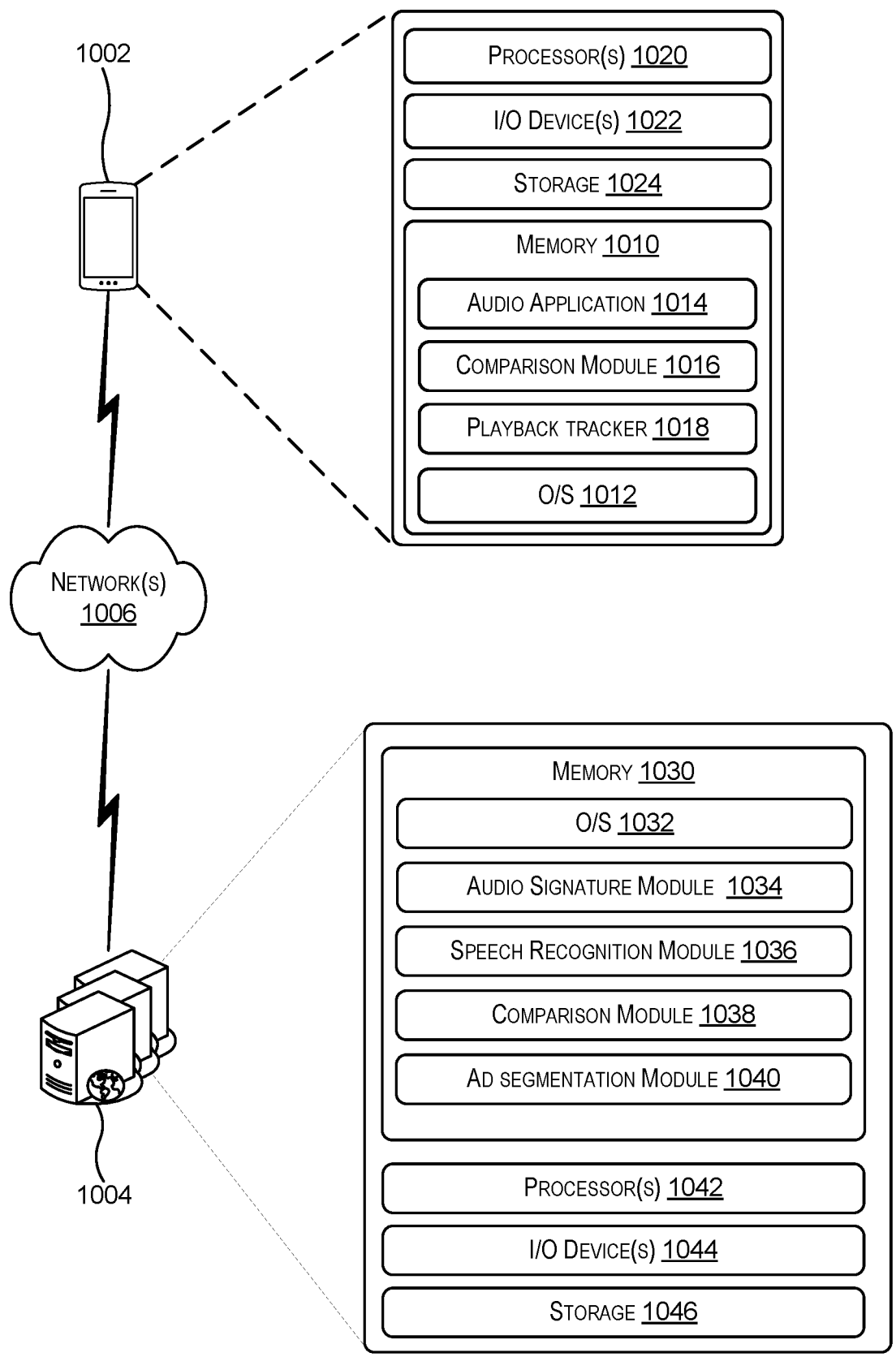
FIG. 10 is a block diagram depicting an example architecture for a computing system configured to compare two audio files to determine advertisement segments, according to several embodiments.

FIG. 10 is a block diagram depicting an example architecture for a computing system configured to compare two audio files to determine advertisement segments, according to several embodiments. The diagram includes a user device 1002, a server device 1004, and one or more network(s) 1006. The user device 1002 and the server device 1004 may be similar to components of computing systems (e.g., computing system 202) described herein. In some embodiments, either the user device 1002 or the server device 1004 can represent a computing system. In other embodiments, the user device 1002 and the server device 1004 are components of the same computing system. The user device 1002 may be similar to the user device 900 of FIG. 9. The network(s) 1006 may include any one or a combination of many different types of networks, such as cable networks, the Internet, wireless networks, cellular networks, and other private and/or public networks.

As described herein, the user device 1002 can have at least one memory 1010, one or more processing units (or processor(s)) 1020, and one or more input/output ("I/O") device(s) 1022. The processor(s) 1020 may be implemented as appropriate in hardware, computer-executable instructions, firmware or combinations thereof. Computer-executable instruction or firmware implementations of the processor(s) 1020 may include computer-executable or machine executable instructions written in any suitable programming language to perform the various functions described. The I/O device(s) 1022 can include displays, monitors, touch screens, mouse, keyboard, or other I/O device.

The memory 1010 may store program instructions that are loadable and executable on the processor(s) 1020, as well as data generated during the execution of these programs, including audio data corresponding to audio files (e.g., audio files 110, 112). Depending on the configuration and type of user device 1002, the memory 1010 may be volatile (such as random access memory ("RAM")) or non-volatile (such as read-only memory ("ROM"), flash memory, etc.). In some implementations, the memory 1010 may include multiple different types of memory, such as static random access memory ("SRAM"), dynamic random access memory ("DRAM") or ROM. The user device 1002 may also include additional storage 1024, such as either removable storage or non-removable storage including, but not limited to, magnetic storage, optical disks, and/or tape storage. The disk drives and their associated computer-readable media may provide non-volatile storage of computer-readable instructions, data structures, program modules, and other data for the computing devices. In some embodiments, the storage 1024 may be utilized to store data contents (e.g., a first audio file and a second audio file) received from one or more other devices (e.g., server device 1004). For example, the storage 1024 may store segmentation data and audio signatures resulting from a comparison of two audio files.

The memory 1010 may include an operating system (O/S) 1012 and one or more application programs, modules, or services for implementing the features disclosed herein, including an audio application 1014, a comparison module 1016, and a playback tracker 1018. The audio application 1014 may be configured to play audio content from an audio file. The comparison module 1016 may be configured to perform audio matching and text matching (e.g., audio matching 214 and text matching 216) in conjunction with the O/S 1012 and other modules. The comparison module 1016 may also be configured to send, receive, and/or store audio data and text transcript data (e.g., transcripts) from the server device 1004. For example, the comparison module 1016 can receive audio signatures from audio signature module 1034 (e.g., an audio signature cloud service) or receive text transcripts from speech recognition module 1036 (e.g., ASR cloud service).

The playback tracker 1018 can be configured to track a progress of the playback of an audio file (e.g., a playback provided by audio application 1014). The tracked progress can be used to determine a resume position for playback of audio content from a second audio file that contains the same content portion but different advertisement portions.

Turning now to server device 1004 in more detail, the server device 1004 can be any suitable type of computing device including, but not limited to, a laptop computer, a desktop computer, a mobile phone, a smartphone, a server computer, etc. In some embodiments, the server device 1004 is executed by one or more virtual machines implemented within a cloud computing or other hosted environment. The cloud computing environment may include provisioned computing resources like computing, storage, and networking. The server device 1004 can communicate with the user device 1002 via the network(s) 1006 or other network connections. The server device 1004 may be configured to implement the functionality described herein as part of a distributed computing environment.

The server device 1004 can include a memory 1030, one or more processor(s) 1042, I/O devices 1044, and at least one storage unit 1046. As with the processor(s) 1020 of user device 1002, the processor(s) 1042 may be implemented as appropriate in hardware, computer-executable instructions, software, firmware, or combinations thereof. Computer-executable instruction, software, or firmware implementations of the processor(s) 1042 may include computer-executable or machine-executable instructions written in any suitable programming language to perform the various functions described. The memory 1030 may store program instructions that are loadable and executable on the processor(s) 1042, as well as data generated during the execution of these programs. Depending on the configuration and type of memory included in the server device 1004, the memory 1030 may be volatile (such as RAM) and/or non-volatile (such as read-only memory ("ROM"), flash memory, or other memory). In some embodiments, the storage 1046 may include one or more databases, data structures, data stores, or the like for storing and/or retaining information associated with the server device 1004 or the user device 1002. The storage 1046 may include a data store for storing audio files, audio data, segmentation data, and audio signatures.

The memory 1030 may include an operating system (O/S) 1032 and one or more application programs, modules, or services for implementing the features disclosed herein, including audio signature module 1034, speech recognition module 1036, comparison module 1038, and ad segmentation module 1040. The modules can be configured to transmit and receive data with the user device 1002 over the network(s) 1006. In some embodiments, one or more operations or functions described herein with respect to the audio signature module 1034, speech recognition module 1036, comparison module 1038, or segmentation module 1040 may be performed at the user device 1002.

As described above, in some embodiments, the audio signature module 1034 can be configured to determine audio signatures or acoustic fingerprints for an audio file. The audio signatures can be stored in storage 1046. The audio signatures can also be transmitted to user device 1002 for use in a comparison of audio data according to techniques described herein.

In some embodiments, the speech recognition module 1036 can be configured to generate transcripts for one or more audio files. The transcripts may be stored in storage 1046. The speech recognition module 1036 can also transmit the transcripts to user device 1002 for use by comparison module 1016 to perform a text comparison of two audio files.

In some embodiments, the ad segmentation module 1040 can be configured to implement a semantic model to identify advertisement segments within an advertisement portion of an audio file. The ad segmentation module 1040 can receive comparison information (e.g., time windows for content portions and advertisement portions) from comparison module 1038 or comparison module 1016 (e.g., if the server device 1004 is implementing the semantic model as a service for the user device 1002). Segmentation data corresponding to the identified advertisement segments can be stored in storage 1046.

Figure 11:
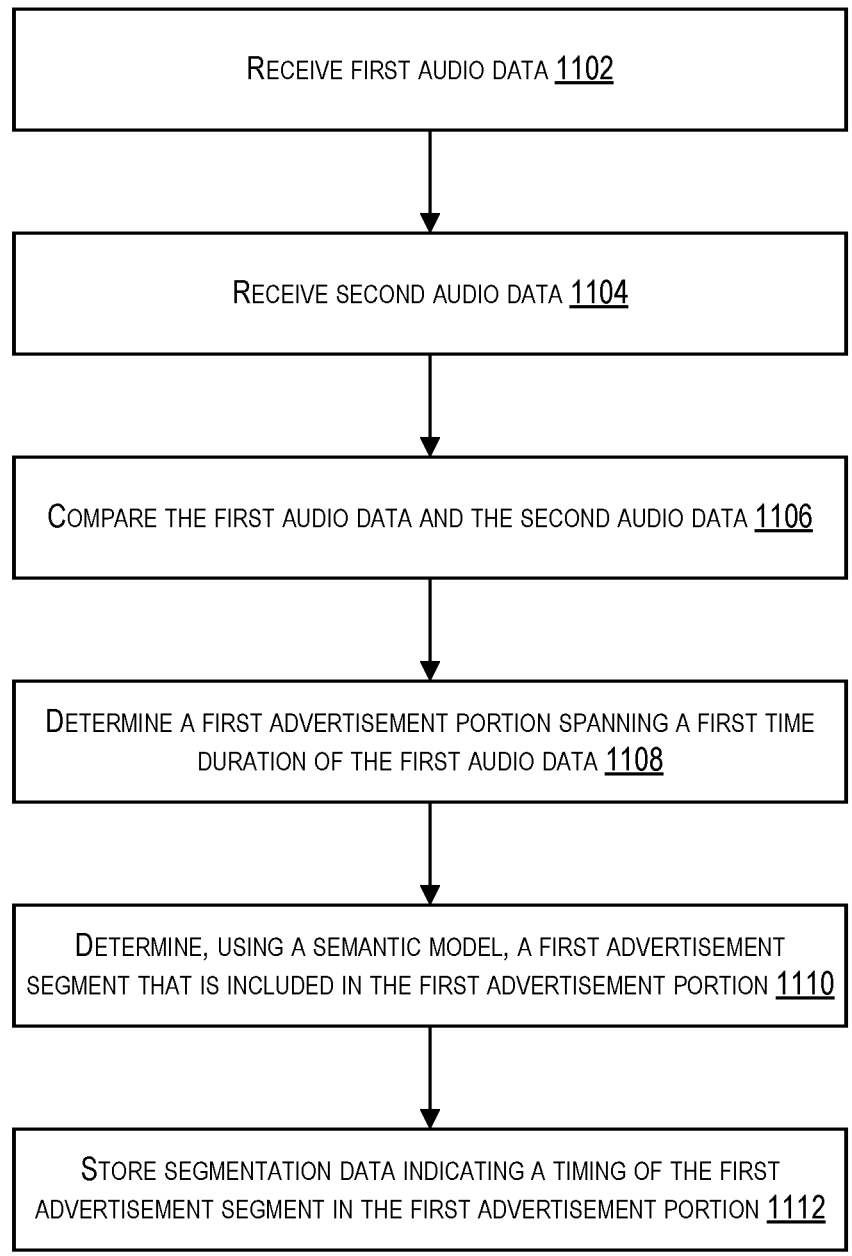
FIG. 11 is a simplified flow diagram of an example process for comparing two audio files to determine advertisement segments, according to several embodiments.

FIG. 11 is a simplified flow diagram of an example process 1100 for comparing two audio files to determine advertisement segments, according to several embodiments. The process 1100 is illustrated as a logical flow diagram, each operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be omitted or combined in any order and/or in parallel to implement the processes.

Some, any, or all of the process 1100 (or any other processes described herein, or variations, and/or combinations thereof) may be performed under the control of one or more computer systems configured with executable instructions and may be implemented as code (e.g., executable instructions, one or more computer programs, or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory. The process 1100 may be performed by one or more computing devices that make up a computing system, including the computing system 202 of FIG. 2 and the user device 1002 or server device 1004 of FIG. 10.

The process 1100 can begin at block 1102, when a computing system receives first audio data. The first audio data can be audio data contained in an audio file (e.g., a first audio file 110). The audio data can correspond to a podcast or other audio media content that contains spoken words. In some embodiments, the audio file is selected by a user.

At block 1104, the computing system can receive second audio data. The second audio data can include audio data contained in a second audio file (e.g., second audio file 112). The second audio file may be a second version of the first audio file, such that the audio files represent different versions of the same underlying audio content. The underlying audio content can be the "primary" audio content (e.g., produced content) of a podcast, radio show, news show, or the like. The audio files can also include advertisements or other material that is different from the primary audio content. Thus, the first audio data and the second audio data can each include a content portion and an advertisement portion. The content portion of the first audio data and the second audio data can represent the same content, while the advertisement portion of the first audio data differs from the advertisement portion of the second audio data.

At block 1106, the computing system can compare the first audio data and the second audio data. The comparison can include an audio comparison and a text comparison. In some embodiments, the audio comparison can include generating a first audio signature based on a first segment (e.g., a content segment) of the first audio data and generating a second audio signature based on a second segment of the second audio data. Based on a match between the first audio signature and the second audio signature, the first segment and the segment can be aligned. For example, a start time of the first segment and a start time of the second segment can be aligned. The alignment can be used to determine an offset between the start times of the first segment and the second segment. Alternatively, the offset can be between end times of the first and second segments. The offset can correspond to a difference between the relative start time of the first segment with respect to the overall play time of the first audio file and the relative start time of the second segment with respect to the overall play time of the second audio file.

In some embodiments, the text comparison can include generating a first transcript of the first audio data and a second transcript of the second audio data. The transcripts can be generated using ASR. The two transcripts can be compared using text matching algorithms to create a word-level correspondence. For example, segments of words in the content portion of the first audio data will match words in the content portion of the second audio data, since the content is the same and can contain the same words in the same order with the same timings. Conversely, the word-level correspondence will indicate a mismatch or no match for words (e.g., unmatched words) in the advertising portions of the audio files, since the advertisements will differ. The matched segments and mismatched segments will correspond to time windows that the computing system can identify. For example, a segment of matched content may occupy a contiguous five minute window. Certain time windows will be miscategorized. The computing system can merge miscategorized time windows into adjacent windows if the miscategorized time windows have a duration falling below a threshold.

In some embodiments, the audio comparison and the text comparison can be performed using a DNN model or a CRF model. Additionally, the audio comparison can be performed using a first DNN model and the text comparison can be performed using a second DNN model. Similarly, the audio comparison and the text comparison can be performed using two CRY models.

At block 1108, the computing system can determine a first advertisement portion spanning a first time duration of the first audio data. The first time duration can correspond to one of the windows or merged windows obtained from the text comparison. Additionally, the first time duration can correspond to a time difference between an end time of a first content segment and the start time of a successive content segment determined from the audio comparison.

At block 1110, a semantic model (e.g., semantic model 604) can be invoked to determine a first advertisement segment included in the first advertisement portion. The first advertisement segment can be one of several distinct advertisement segments in the first advertisement portion. The semantic model can be a machine learning model that includes an ML transformer (e.g., ML transformer 606) and an ad segmentation layer (e.g., ad segmentation layer 608). The semantic model can be trained using a first corpus of text (e.g., training data 814) to establish a plurality of model parameters. A first subset of the model parameters corresponding to the ML transformer (e.g., transformer parameters 810) can be fixed. The ad segmentation layer can then be retrained using a second corpus of text (e.g., advertisement training text 816). The second corpus of text can include text from an assortment of advertisements. Based on the retraining, a second subset of model parameters corresponding to the ad segmentation layer (e.g., classifier parameters 812) may be updated without changing the first subset of model parameters.

In some embodiments, the first advertisement segment can be determined by inputting text data into the semantic model. The text data can be text from the first transcript that falls within the window corresponding to the first advertisement portion. Based on the input text data, the semantic model can output a prediction of a starting word of the first advertisement segment. The starting word can be the word in the text data identified as the start of the first advertisement segment. Additionally, the semantic model can predict additional starting words for subsequent advertisement segments in the first advertising portion. The words in the text data between successive starting words can therefore correspond to a single advertisement.

In some embodiments, the computing system can, based on the comparison, determine additional advertisement segments from the second audio data. Similar to determining the first advertisement segment in the first audio data, the computing system can determine a second advertising portion spanning a second time duration of the second audio data. The computing system can then input a portion of the second transcript corresponding to the second advertising portion into the semantic model to obtain a predicted starting word of the second advertisement segment.

In other embodiments, the computing system can implement a first semantic model and a second semantic model. The two semantic models can be trained on text in different languages in order to provide support for determining advertisements in different languages. The first semantic model can be trained and retrained on the first corpus and second corpus of text in a first language. The second semantic model can be trained and retrained on a third corpus and fourth corpus of text in a second language.

Once the advertisement segments have been determined within the advertisement portions, the computing system can store segmentation data in a data store associated with the computing system (e.g., data store 224), at block 1112. The segmentation data can include a timing of the first advertisement segment in the first advertisement portion. The timing can indicate the duration (e.g., a segment duration) of the first advertisement segment and the relative position within the first audio data (e.g., a start time). The segmentation data can also include a segment ID (e.g., a name or other identifier for the advertisement segment), a segment signature pattern (e.g., one or more audio signatures determined during the audio comparison that correspond to the advertisement segment), and a segment type (e.g., identifying that the segment corresponds to an advertisement). Segmentation data can also include similar data corresponding to segments of content determined from the comparison in addition to segmentation data for the individual advertisement segments.

In some embodiments, the segmentation data can be used to create an advertisement library. The advertisement library can be a database or other data store of advertisement data, including the segmentation data and corresponding text transcripts of the advertisement segments. Building the advertisement library can allow the computing system to have a readily accessible repository of accurate advertisement data to use to further train the semantic model.

Figure 12:
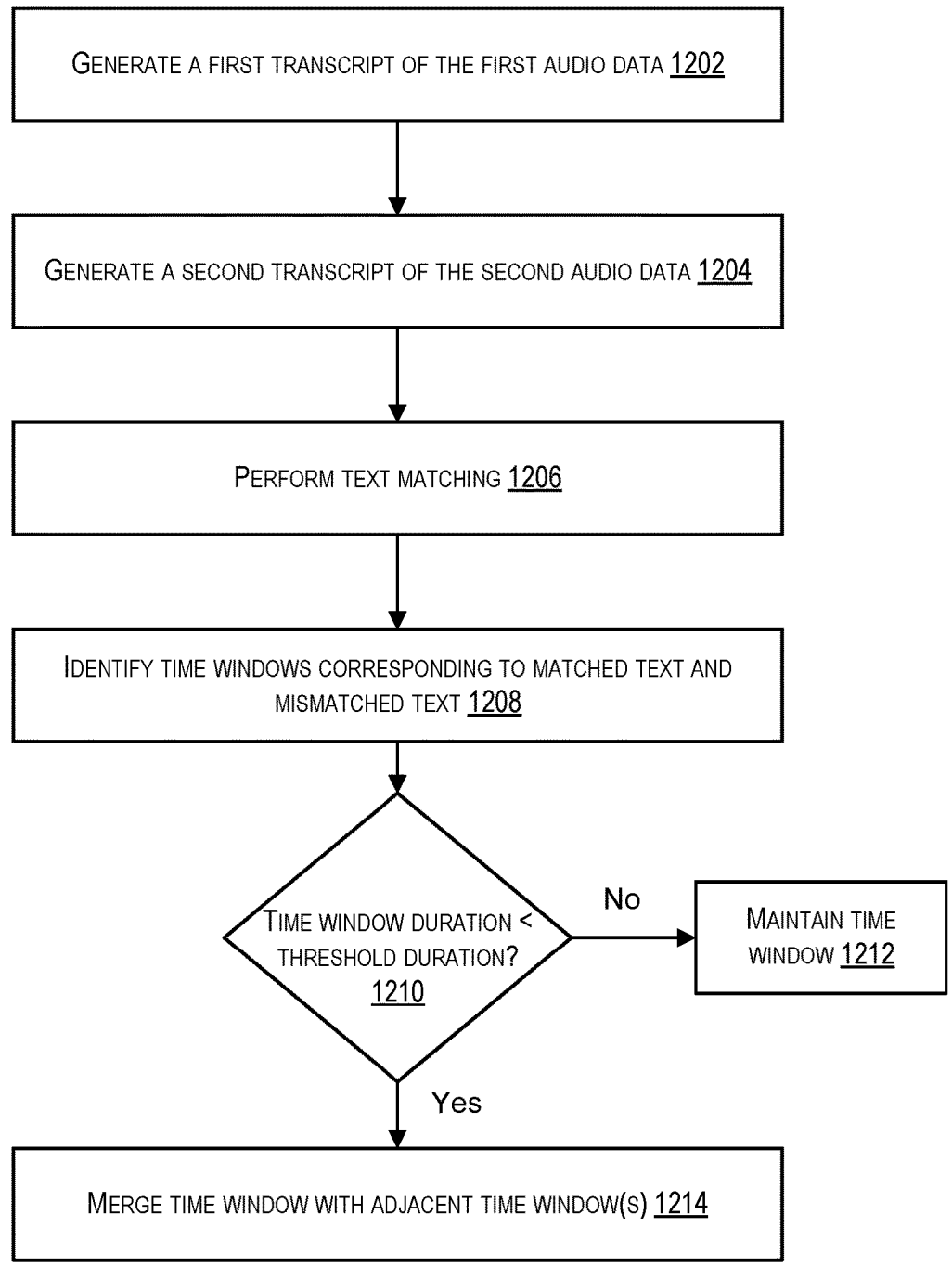
FIG. 12 is another simplified flow diagram of an example process for identifying and merging windows of corresponding text, according to some embodiments.

FIG. 12 is another simplified flow diagram of an example process 1200 for identifying and merging windows of corresponding text, according to some embodiments. Here, the computing system has already received two audio files containing first audio data and second audio data. Operations described with respect to process 1200 may be similar to operations described above with respect to FIGS. 4 and 5.

The process 1200 may begin at block 1202 with the computing system generating a first transcript of the first audio data. The transcript may be generated using ASR or similar techniques implemented by a speech recognition module (e.g., speech recognition module 210) of the computing system. At block 1204 the computing system can generate a second transcript for the second audio data. The computing system can then compare the two transcripts by text matching, at block 1206. One or more of the operations of block 1206 may be similar to operations described above for block 1106 of FIG. 11.

The text comparison can result in a word-level correspondence between the first transcript for the first audio data and the second transcript for the second audio data. Based on the word-level correspondence, the computing system can identify, at block 1208, time windows corresponding to matched text and mismatched text. The matched text can be text in the first transcript that matches text in the second transcript (e.g., a string of consecutive words that match from the first transcript to the second transcript). The mismatched text can be text that corresponds to a non-matching word. The mismatched text can also be text that has no corresponding word in the other transcript (e.g., unmatched text, due to different lengths of segments). A segment of matched text will correspond to a time window that bounds the matched text for a duration. For example, one sentence in the first transcript may correspond to 15 seconds of audio and may match another sentence in the second transcript. This sentence then corresponds with a 15 second time window of matched text. Similarly, segments of mismatched/unmatched text can correspond to additional time windows.

At decision 1210, the computing system can determine if the duration of a time window is less than a threshold duration. The threshold duration can be based on a ratio of the duration of the time window to the duration of an adjacent time window. Additionally, the threshold duration can be based on a ratio of the duration of the time window to the duration of a resulting merged window if the time window were merged with the two adjacent time windows. The threshold duration can be set so that short duration time windows of one type (e.g., matched text or mismatched text) adjacent to significantly longer duration time windows of the other type are identified as miscategorized. If the duration of the time window does not fall below the threshold duration, then the time window is maintained, at block 1212.

If the duration of the time window falls below the threshold duration, then the computing system can merge the time window with the adjacent time windows to produce a merged time window at block 1214. The merging of time windows can be done iteratively, such that the computing system performs the operations of block 1208-1214 for each time window identified from the text matching. The order of merging windows can be prioritized by ranking the time windows based on their durations.

Figure 13:
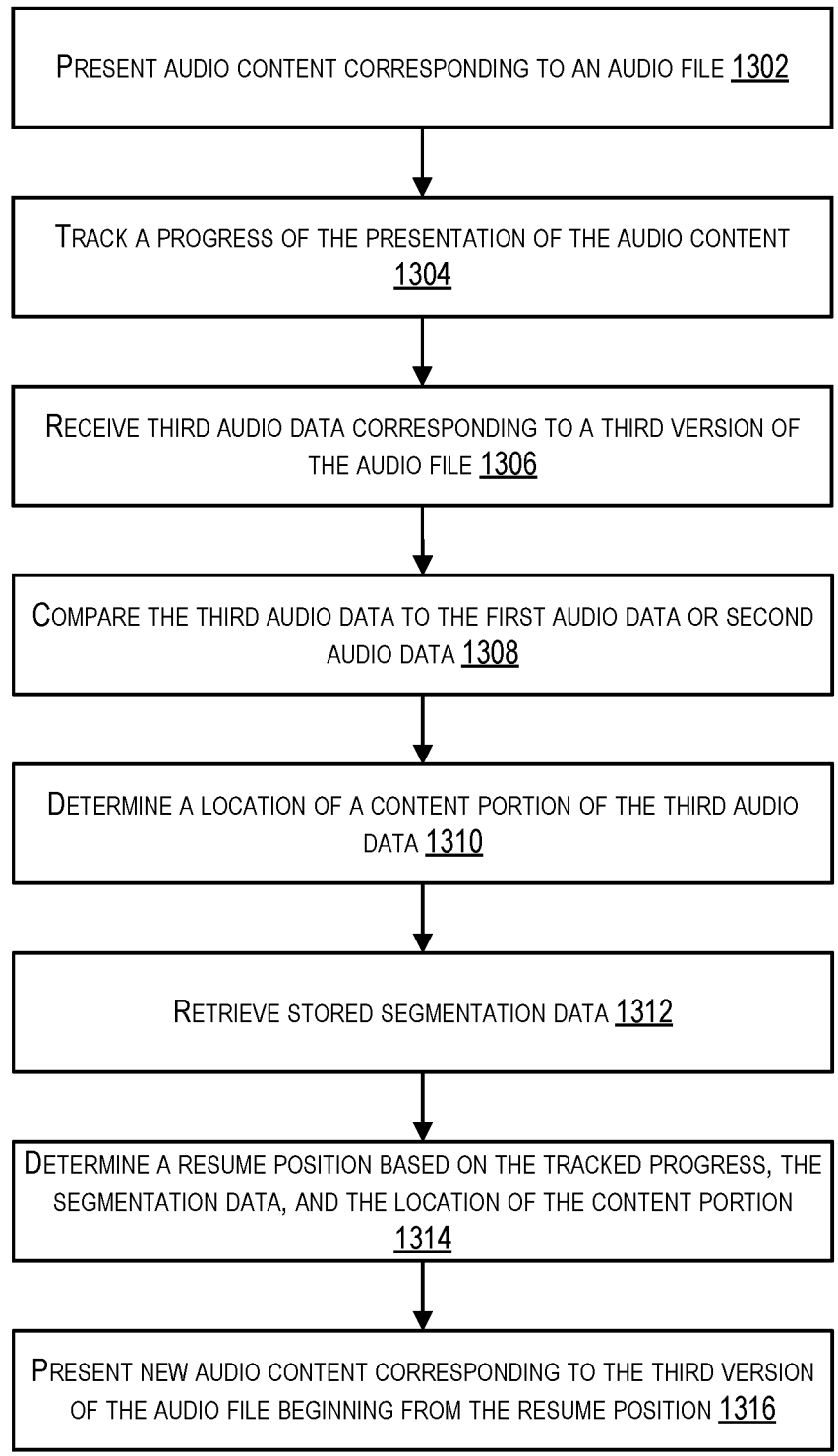
FIG. 13 is another simplified flow diagram of an example process for tracking playback of an audio file and presenting another audio file containing the same audio content based on the tracking, according to some embodiments.

FIG. 13 is another simplified flow diagram of an example process 1300 for tracking playback of an audio file and presenting another audio file containing the same audio content based on the tracking, according to some embodiments. Here, again, the computing system has already received first audio data in a first version of an audio file and second audio data in a second version of the audio file, compared the audio data, and obtained and stored segmentation information. Operations described with respect to process 1300 may be similar to operations described above with respect to FIG. 9.

Process 1300 may begin at block 1302, when the computing system can present audio content corresponding to the second version of the audio file. The audio file can be a podcast, and the first and second versions of the audio file can be audio files that include the podcast content but have different dynamic advertisements. Presenting the audio content may include playing the audio content over a speaker or other output device of the computing system (e.g., at the speaker of a smartphone).

At block 1304, the computing system can track a progress (e.g., progress 910) of the presentation of the audio content. The tracked progress can correspond to an elapsed time of the presentation.

At block 1306, the computing system may receive third audio data corresponding to a third version of the audio file. The third audio data may be received if the audio file is downloaded another time. For example, the presentation of the audio content may represent a first play through of a podcast at a user device. Subsequently the audio file stored at the user device may be deleted, requiring a user to download the podcast another time. This new podcast file may contain different dynamic advertisements than the podcast used for the first play through, which can change the relative timings of the content portion of the podcast.

At block 1308, the computing system can compare the third audio data to one of the first audio data or the second audio data. This comparison may be similar to other comparison operations described herein, including block 1106 of FIG. 11. This comparison can be done to determine the locations and timings of the content portion and advertisement portion of the third audio data (e.g., the audio data desired to resume playback of the podcast). The computing system may also determine a location of a content portion of the third audio data at block 1310. The location can be a timing (e.g., a start time and an end time) of the content portion with the third audio data.

At block 1312, the computing system can retrieve segmentation data. The segmentation data can correspond to the second audio data and contain locations and timings of advertisements and advertisement segments with the second audio data. Based on this segmentation data, the tracked progress, and the location of the content portion in the third audio data, the computing system may determine a resume position, at block 1314. The resume position can correspond to the same position in the third audio data relative to the tracked progress in the second audio data.

Finally, at block 1316, the computing system can present new audio content corresponding to the third version of the audio file, with the presentation beginning from the resume position. The new audio content can be the same podcast that was previously presented and tracked, but with a different advertisement portion.

Figure 14:
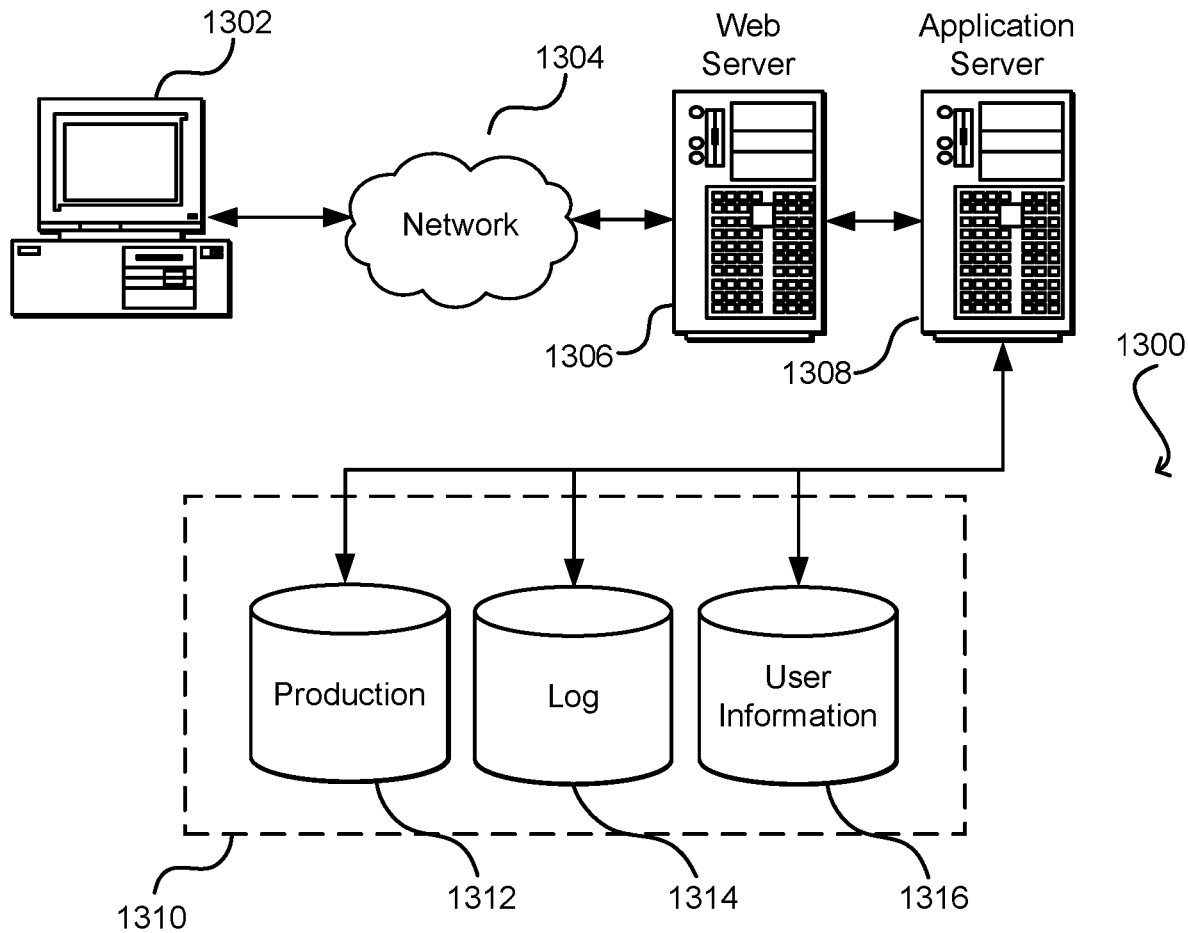
FIG. 14 illustrates an environment in which various embodiments can be implemented.

FIG. 14 illustrates aspects of an example environment 1400 for implementing aspects in accordance with various embodiments. As will be appreciated, although a Web-based environment is used for purposes of explanation, different environments may be used, as appropriate, to implement various embodiments. The environment includes an electronic client device 1402, which can include any appropriate device operable to send and receive requests, messages, or information over an appropriate network 1404 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 1406 for receiving requests and serving content in response thereto, although for other networks an alternative device serving a similar purpose could be used as would be apparent to one of ordinary skill in the art.

The illustrative environment includes at least one application server 1408 and a data store 1410. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio, and/or video to be transferred to the user, which may be served to the user by the Web server in the form of HyperText Markup Language ("HTML"), Extensible Markup Language ("XML"), or another appropriate structured language in this example. The handling of all requests and responses, as well as the delivery of content between the client device 1402 and the application server 1408, can be handled by the Web server. It should be understood that the Web and application servers are not required and are merely example components, as structured code discussed herein can be executed on any appropriate device or host machine as discussed elsewhere herein.

The data store 1410 can include several separate data tables, databases or other data storage mechanisms and media for storing data relating to a particular aspect. For example, the data store illustrated includes mechanisms for storing production data 1412 and user information 1416, which can be used to serve content for the production side. The data store also is shown to include a mechanism for storing log data 1414, which can be used for reporting, analysis, or other such purposes. It should be understood that there can be many other aspects that may need to be stored in the data store, such as for page image information and to access right information, which can be stored in any of the above listed mechanisms as appropriate or in additional mechanisms in the data store 1410. The data store 1410 is operable, through logic associated therewith, to receive instructions from the application server 1408 and obtain, update or otherwise process data in response thereto. In one example, a user might submit a search request for a certain type of item. In this case, the data store might access the user information to verify the identity of the user and can access the catalog detail information to obtain information about items of that type. The information then can be returned to the user, such as in a results listing on a Web page that the user is able to view via a browser on the user device 1402. Information for a particular item of interest can be viewed in a dedicated page or window of the browser.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 14. Thus, the depiction of the environment 1400 in FIG. 14 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers, and business application servers. The server(s) also may be capable of executing programs or scripts in response to requests from user devices, such as by executing one or more Web applications that may be implemented as one or more scripts or programs written in any programming language, such as Java©, C, C#, or C++, or any scripting language, such as Perl, Python, or TCL, as well as combinations thereof. The server(s) may also include database servers, including without limitation those commercially available from Oracle©, Microsoft©, SAP©, and IBM©.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired)), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk (DVD), or other optical storage, magnetic cassettes, magnetic tape, magnetic disk storage, or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A system, comprising:
one or more processors; and
one or more memories storing computer-executable instructions that, when executed with the one or more processors, cause the system to at least:
receive a first podcast file corresponding to a first version of an audio file, the first podcast file comprising first audio data, the first podcast file selected by a user;
receive a second podcast file corresponding to a second version of the audio file, the second podcast file comprising second audio data;
generate a first transcript of the first podcast file;
generate a second transcript of the second podcast file;
compare the first podcast file and the second podcast file by at least:
comparing the first audio data and the second audio data; and
comparing the first transcript and the second transcript;
determine, based at least in part on the comparison of the first podcast file and the second podcast file, a first advertisement portion spanning a first time duration of the first audio data and a second advertisement portion spanning a second time duration of the second audio data, the second advertisement portion being included in the second audio data in lieu of the first advertisement portion in the first audio data;
determine text data from the first transcript, the text data corresponding to the first time duration;
determine, by using a trained semantic model, an advertisement segment that is included in the first advertisement portion, wherein an input to the trained semantic model comprises the text data; and
store segmentation data corresponding to the first podcast file, the segmentation data indicating the first time duration and a timing of the advertisement segment in the first advertisement portion.

2. The system of claim 1, wherein the one or more memories store further computer-executable instructions that, when executed by the one or more processors, further cause the system to at least:
generate a first audio signature based on a first segment of the first audio data and a second audio signature based on a second segment of the second audio data;
align the first segment and the second segment based on a match between the first audio signature and the second audio signature; and
determine, based at least in part on the alignment, an offset between at least one of (i) start times of the first segment and the second segment, or (ii) end times of the first segment and the second segment.

3. The system of claim 1, wherein the one or more memories store further computer-executable instructions that, when executed by the one or more processors, further cause the system to at least:
determine, by performing text matching on the first transcript and the second transcript, mismatched words;
identify time windows corresponding to the mismatched words;
determine that each time window has a duration falling below a threshold duration; and
merge the time windows into a merged time window.

4. The system of claim 1, wherein the trained semantic model comprises a machine learning (ML) transformer and an advertisement segmentation layer, and wherein the trained semantic model is trained by at least:
training the ML transformer and the advertisement segmentation layer on a first corpus of text, the training resulting in a plurality of model parameters;
fixing a first subset of the plurality of model parameters corresponding to the ML transformer; and
retraining the advertisement segmentation layer on a second corpus of text to update a second subset of the plurality of model parameters corresponding to the advertisement segmentation layer, the second corpus comprising text associated with advertisements having known lengths.

5. A computer-implemented method, comprising:
receiving first audio data corresponding to a first version of an audio file;
receiving second audio data corresponding to a second version of the audio file;
comparing the first audio data and the second audio data by performing a transcript comparison and an audio signature comparison, the comparing comprising at least inputting a word-level correspondence from the transcript comparison and offset information from the audio signature comparison into a predictive model to produce model output information;
determining, based at least in part on the model output information, a first advertisement portion spanning a first time duration of the first audio data;
determining, by using a trained semantic model, a first advertisement segment that is included in the first advertisement portion; and
storing segmentation data corresponding to the first audio data, the segmentation data indicating a timing of the first advertisement segment in the first advertisement portion.

6. The computer-implemented method of claim 5, further comprising:
determining, based at least in part on the comparison, a second advertisement portion spanning a second time duration of the second audio data;
determining, by using the trained semantic model, additional advertisement segments that are included in the second advertisement portion; and
storing additional segmentation data corresponding to the second audio data, the additional segmentation data indicating additional timings of the additional advertisement segments in the second advertising portion.

7. The computer-implemented method of claim 5, wherein comparing the first audio data and the second audio data comprises:
generating a first audio signature based on a first segment of the first audio data and a second audio signature based on a second segment of the second audio data;
aligning the first segment and the second segment based on a match between the first audio signature and the second audio signature; and
determining, based at least in part on the alignment, the offset information, the offset information comprising an offset between at least one of (i) start times of the first segment and the second segment, or (ii) end times of the first segment and the second segment.

8. The computer-implemented method of claim 5, wherein comparing the first audio data and the second audio data comprises:

generating, using automatic speech recognition (ASR), a first transcript of the first audio data;

generating, using ASR, a second transcript of the second audio data;

determining, by performing text matching on the first transcript and the second transcript, the word-level correspondence;

identifying time windows corresponding to the word-level correspondence;

determining that each time window has a duration falling below a threshold duration; and merging the time windows into a merged time window.

9. The computer-implemented method of claim 8, wherein the word-level correspondence comprises matched words and mismatched words, and wherein the time windows comprise matched windows corresponding to the matched words and mismatched windows corresponding to the mismatched words.

10. The computer-implemented method of claim 5, wherein the predictive model comprises a deep neural network (DNN) model.

11. The computer-implemented method of claim 5, wherein the trained semantic model comprises a machine learning (ML) transformer and an advertisement segmentation layer, and wherein the trained semantic model is trained by at least:

training the ML transformer and the advertisement segmentation layer on a first corpus of text, the training resulting in a plurality of model parameters;

fixing a first subset of the plurality of model parameters corresponding to the ML transformer; and retraining the advertisement segmentation layer on a second corpus of text to update a second subset of the plurality of model parameters corresponding to the advertisement segmentation layer, the second corpus comprising text associated with advertisements having known lengths.

12. The computer-implemented method of claim 11, wherein determining the first advertisement segment comprises inputting text data into the trained semantic model to obtain a starting word corresponding to the first advertising segment, the starting word predicted by the trained semantic model based at least in part on the first subset and the updated second subset of the plurality of model parameters.

13. The computer-implemented method of claim 5, wherein the trained semantic model comprises a multi-language model trained on a corpus of text comprising first text in a first language and second text in a second language.

14. The computer-implemented method of claim 5, further comprising:

generating, using the stored segmentation data, an advertisement library comprising advertisements having known lengths.

15. The computer-implemented method of claim 5, wherein storing the segmentation data comprises storing a segment ID, a segment duration, a segment signature pattern, and a segment type.

16. One or more non-transitory computer-readable storage media storing instructions that, when executed by a computer system, cause the computer system to perform operations comprising:

receiving first audio data corresponding to a first version of an audio file;

receiving second audio data corresponding to a second version of the audio file;

comparing the first audio data and the second audio data;

determining, based at least in part on the comparison, a first advertisement portion spanning a first time duration of the first audio data and a second advertisement portion spanning a second time duration of the second audio data;

determining, using a trained semantic model, a first advertisement segment that is included in the first advertisement portion and a second advertisement segment that is included in the second advertisement portion, wherein inputs to the trained semantic model comprise a first text corresponding to the first advertisement portion and a second text corresponding to the second advertisement portion; and storing segmentation data corresponding to the first audio data and the second audio data, the segmentation data indicating timings of the first advertisement segment and the second advertisement segment.

17. The one or more non-transitory computer-readable storage media of claim 16, storing additional instructions that, when executed, cause the computer system to perform additional operations comprising:

presenting, at a user device of the computer system, audio content corresponding to the second version of the audio file;

tracking a progress of the presenting of the audio content;

receiving third audio data corresponding to a third version of the audio file;

determining, based at least in part on the progress, a resume position for the audio content; and presenting, at the user device, new audio content of the third version of the audio file, the presentation of the new audio content beginning from the resume position.

18. The one or more non-transitory computer-readable storage media of claim 17, storing additional instructions that, when executed, cause the computer system to perform additional operations comprising:

comparing the third audio data to at least the first audio data or the second audio data;

determining a location of a content portion of the third audio data;

retrieving the stored segmentation data; and computing the resume position using at least the stored segmentation data, the tracked progress, and the location of the content portion.

19. The one or more non-transitory computer-readable storage media of claim 17, storing additional instructions that, when executed, cause the computer system to perform additional operations comprising:

generating, using automatic speech recognition (ASR), text corresponding to the second audio data, the text comprising content text and advertising text;

synchronizing at least the content text with the second audio content of the third version of the audio file; and while presenting the second audio content:

presenting, at a display of the user device, the synchronized content text.

20. The one or more non-transitory computer-readable storage media of claim 16, wherein comparing the first audio data and the second audio data comprises an audio signature comparison and a transcript comparison, and further comprises:

performing the audio signature comparison and the transcript comparison together as part of a conditional random field (CRF) model.

* * * * *